US012758945B2

(12) United States Patent
Tahir

(10) Patent No.: US 12,758,945 B2
(45) Date of Patent: Oct. 13, 2026

(54) METHOD AND SYSTEM FOR CONSTRUCTING CFs/$TIO_2$ NANOTEXTURE FROM RECYCLED CARBON FIBER-REINFORCED POLYMERS (CFRPs) FOR PHOTOCATALYTIC HYDROGEN PRODUCTION

(71) Applicant: United Arab Emirates University, Al Ain (AE)

(72) Inventor: Muhammad Tahir, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/388,188

(22) Filed: Nov. 13, 2025

(65) Prior Publication Data

US 2026/0070042 A1 Mar. 12, 2026

Related U.S. Application Data

(62) Division of application No. 18/601,002, filed on Mar. 11, 2024, now Pat. No. 12,515,199.

(51) Int. Cl.
*B01J 21/18* (2006.01)
*B01J 35/39* (2024.01)
(Continued)

(52) U.S. Cl.
CPC ............... *B01J 21/18* (2013.01); *B01J 35/39* (2024.01); *B01J 35/45* (2024.01); *B01J 35/51* (2024.01);
(Continued)

(58) Field of Classification Search
CPC ... B29B 17/02; B29B 17/0206; B29B 17/021; B01J 21/18; B01J 35/39
See application file for complete search history.

(56) References Cited

U.S. PATENT DOCUMENTS

2016/0060535 A1* 3/2016 Gehr ....................... C10B 57/02
423/447.8

OTHER PUBLICATIONS

Meyer. CFRP-Recycling Following a Pyrolysis route: Process Optimization and Potentials. Journal of Composite Materials vol. 43 No. 9 2009. (Year: 2009).*

(Continued)

*Primary Examiner* — Matthew E. Hoban
(74) *Attorney, Agent, or Firm* — MH2 Technology Law Group LLP

(57) ABSTRACT

There is disclosed a method of developing semiconductor photocatalysts by recycling Carbon Fiber-Reinforced Polymers (CFRP) waste, the method comprising separating or removing a polymer layer of carbon-fibre waste via thermal decomposition; and coupling the resulting carbon-fibres as a cocatalyst with semiconductor materials; for photocatalytic water splitting results in producing hydrogen ($H_2$). The semiconductor materials such as titanium dioxide ($TiO_2$), to be used as composite materials, and coupling the carbon-fibres as a cocatalyst with semiconductor materials is done via facile hydrothermal methods and ultrasonic/physical mixing approaches (CFs/$TiO_2$-A). Further disclosed is a carbon fiber (CF)/$TiO_2$ composite comprising well-distributed and uniformly sized $TiO_2$ nanoparticles, wherein the $TiO_2$ particles are uniformly attached to the CF surface, wherein the CF is synthesized by being separated from a polymer layer of CFRP waste.

14 Claims, 16 Drawing Sheets

Schematic illustration for the preparation of CFs from CFRPs through thermal decomposition

(51) Int. Cl.
*B01J 35/45* (2024.01)
*B01J 35/51* (2024.01)
*B01J 37/04* (2006.01)

(52) U.S. Cl.
CPC ............ *B01J 37/04* (2013.01); *B01J 2235/10* (2024.01); *B01J 2235/15* (2024.01); *B01J 2235/30* (2024.01)

(56) References Cited

OTHER PUBLICATIONS

Wu. Recycling Carbon Fiber from Carbon Fiber-Reinforced Polymer and Its reuse in photocatalysis:a review. Polymers, 15, 170. Dec. 29, 2022. (Year: 2022).*

Nguyen. Enhanced photocatalytic activity in water splitting for hydrogen generation by using TiO2 coated carbon fiber with high reusability. International journal of hydrogen energy 47 (2022) 41621-41630 (Year: 2022).*

Wang. Low Temperature fabrication and photocatalytical activity of carbon fiber-supported TiO2 with different phase compositions. Journal of Hazardous Materials 290 (2015) 134-141. (Year: 2015).*

Retsch. Planetary Ball Mill PM100 (archived on Jun. 17, 2022 via web archive). retrieved from https://web.archive.org/web/20220617093006/https://www.retsch.com/products/milling/ball-mills/planetary-ball-mill-pm-100/function-features/ on Feb. 12, 2026 (Year: 2022).*

Jiang, "Multiscale graphene oxide-carbon fiber reinforcements for advanced polyurethane composites", Composites: Part A, vol. 87 (2016 ) pp. 1-9 (Year: 2016).

Wang, "TiO2 nanoparticle decorated carbon nanofibers for removal of organic dyes", Colloids and Surfaces A, vol. 549 , Jul. 20, 2018, pp. 205-211 (Year: 2018).

* cited by examiner

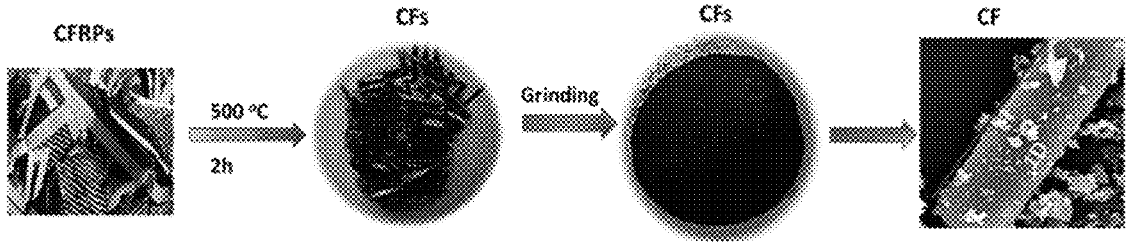
Fig. 1 - Schematic illustration for the preparation of CFs from CFRPs through thermal decomposition
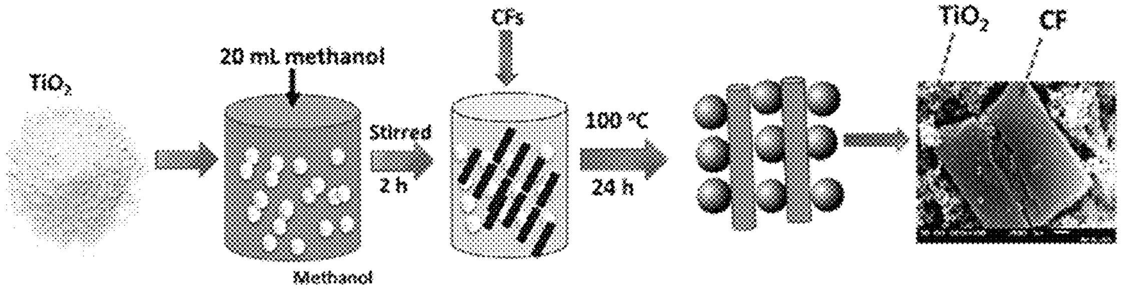
Fig. 2 - Schematic illustration for the physical mixing method for CFs/$TiO_2$ composites
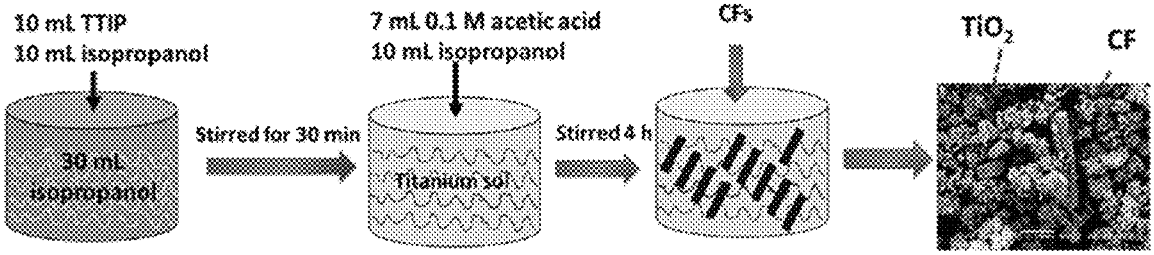
Fig. 3 - Schematic illustration for the sol–gel method for the synthesis of CFs/$TiO_2$-S composite

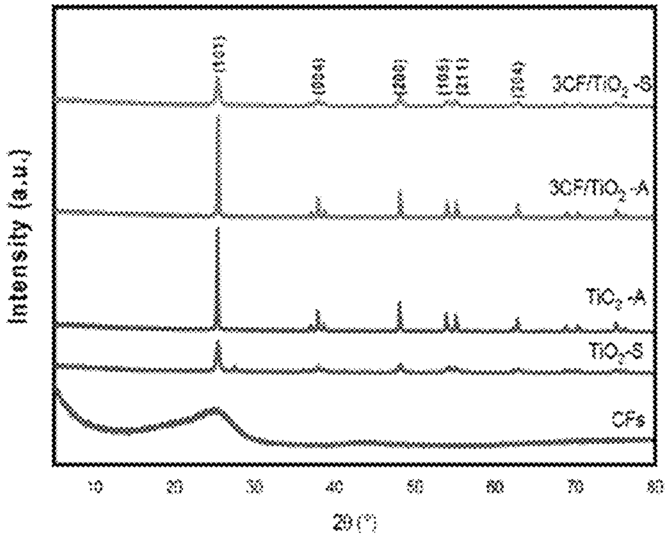
Fig. 4 - XRD patterns of CF, $TiO_2$-A, $TiO_2$-S, CF/$TiO_2$-A, and CF/$TiO_2$-S samples
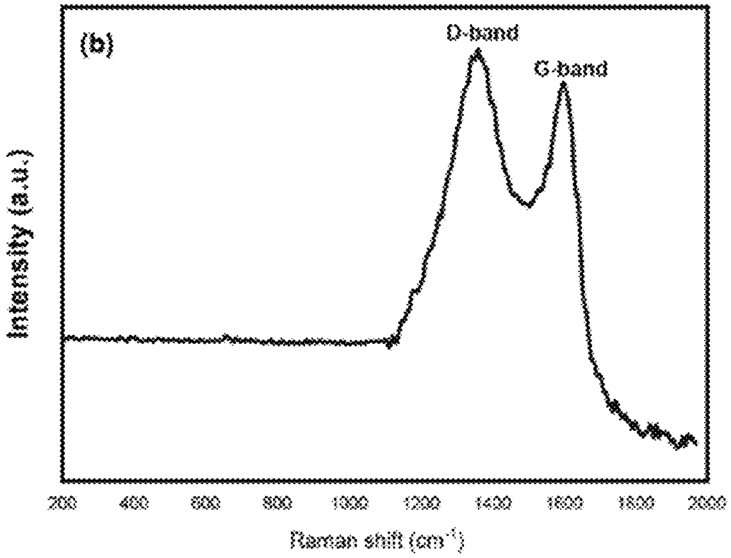
Fig. 5A - Raman analysis of CFs

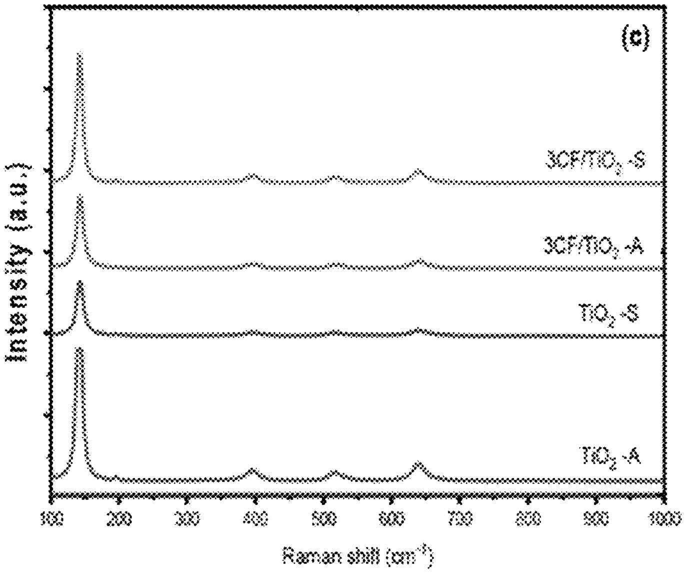
Fig. 5B - Raman patterns of $TiO_2$-A, $TiO_2$-S, CF/$TiO_2$-A, and CF/$TiO_2$-S samples
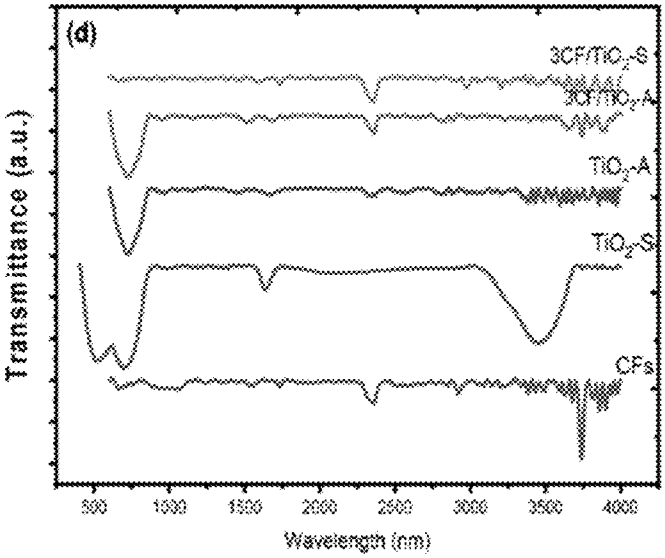
Fig. 6 - IR patterns of CF, $TiO_2$-A, $TiO_2$-S, CF/$TiO_2$-A, and CF/$TiO_2$-S samples

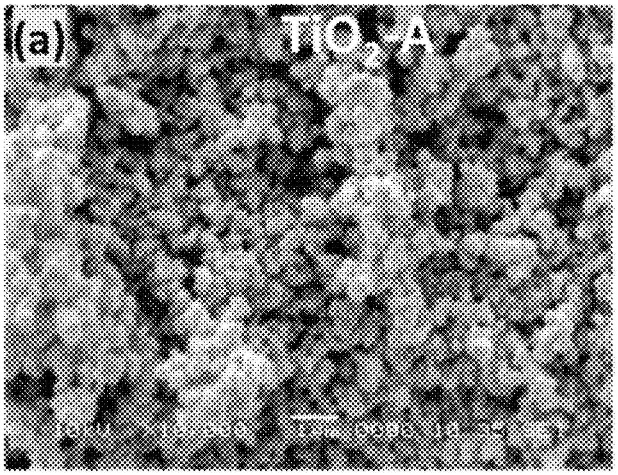
Fig. 7A - SEM images of $TiO_2$-A
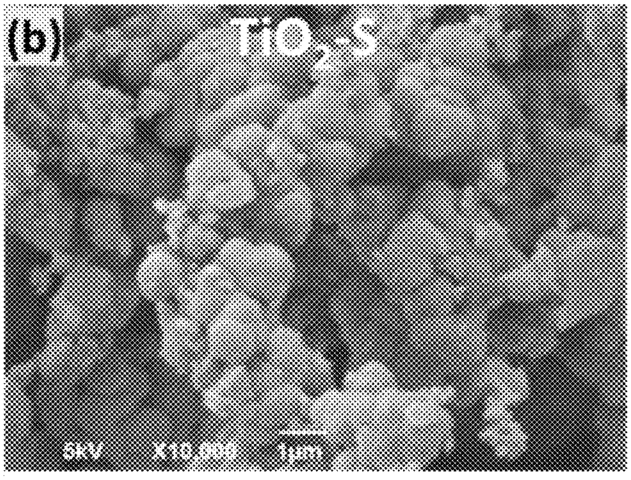
Fig. 7B - SEM images of $TiO_2$-S

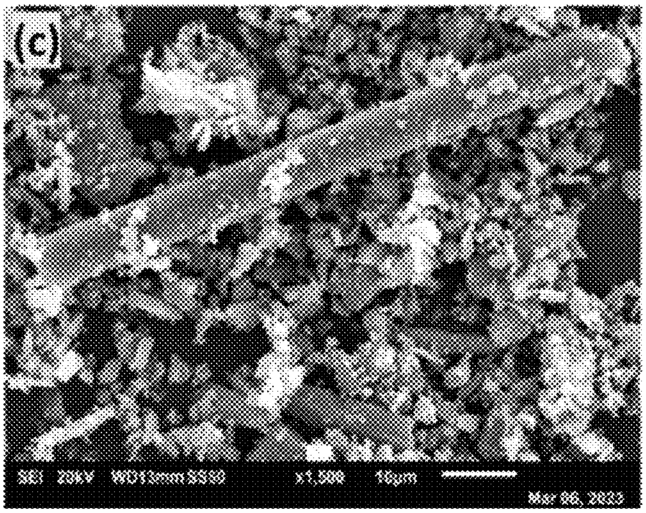
Fig. 7C - SEM images of CFs
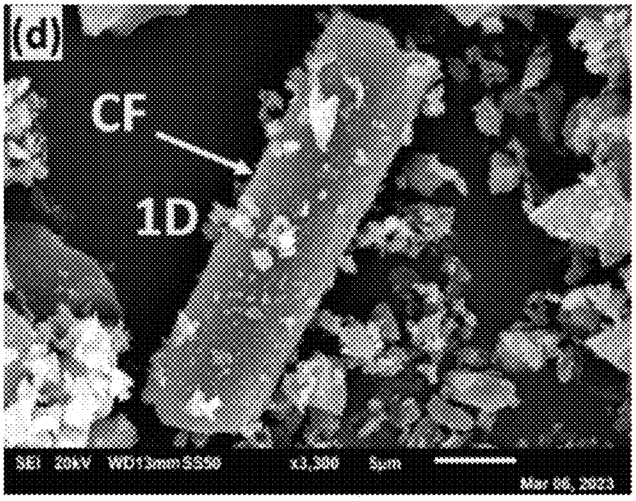
Fig. 7D - SEM images of CFs

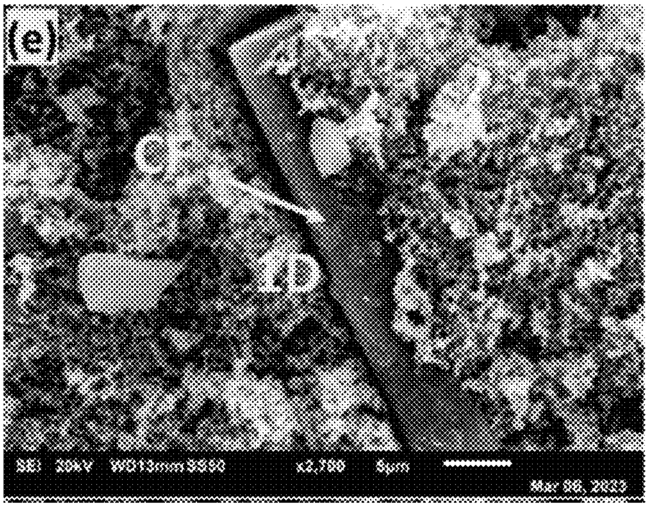
Fig. 7E - SEM images of 3CFs/$TiO_2$-A
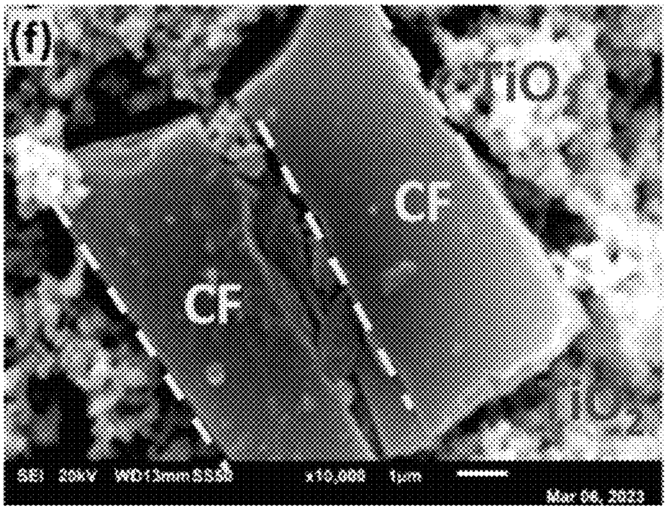
Fig. 7F - SEM images of 3CFs/$TiO_2$-A

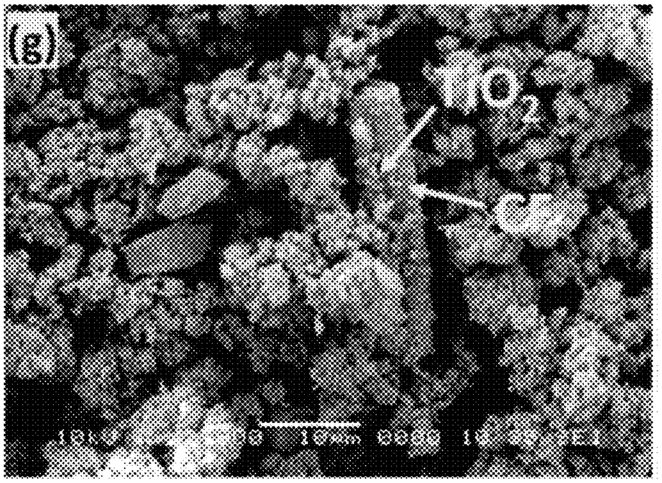
Fig. 7G - SEM images of $3CFs/TiO_2$-S
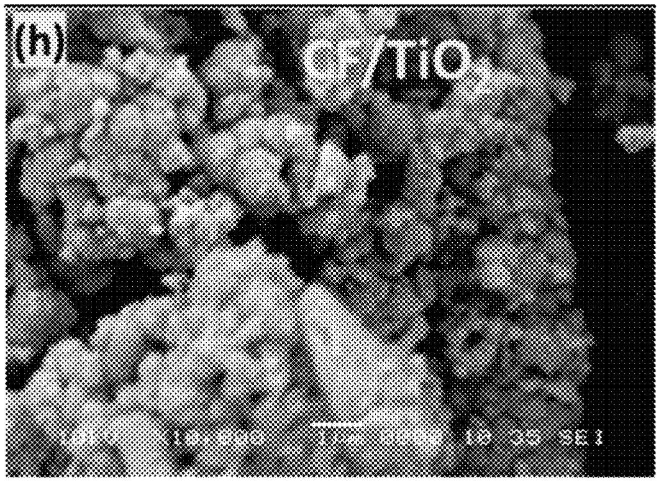
Fig. 7H - SEM images of $3CFs/TiO_2$-S

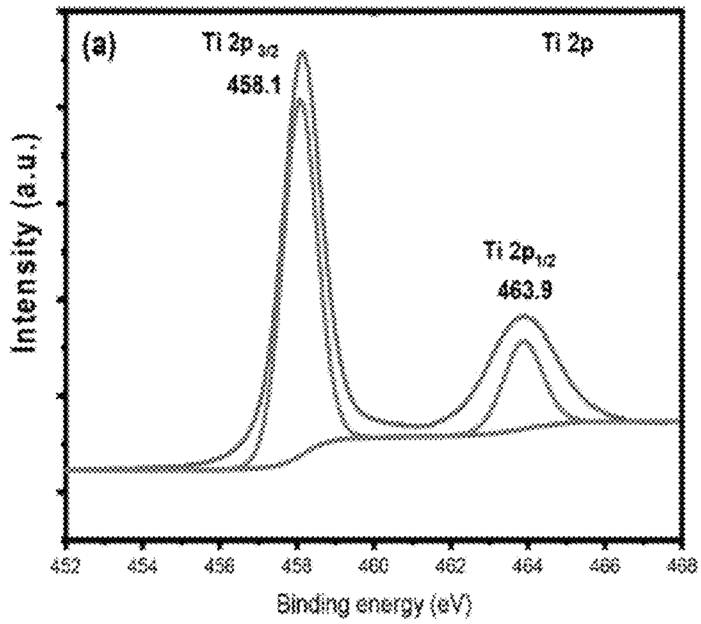
Fig. 8A - XPS spectra of Ti 2p
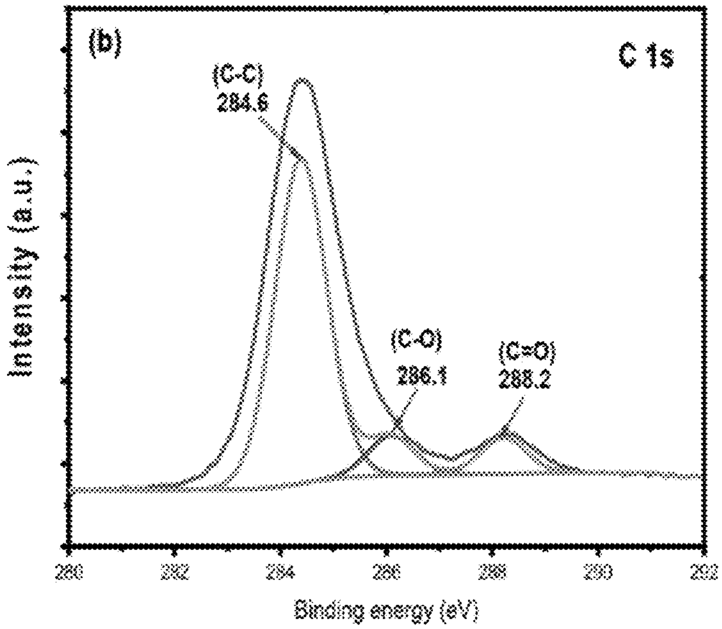
Fig. 8B - XPS spectra of C 1s

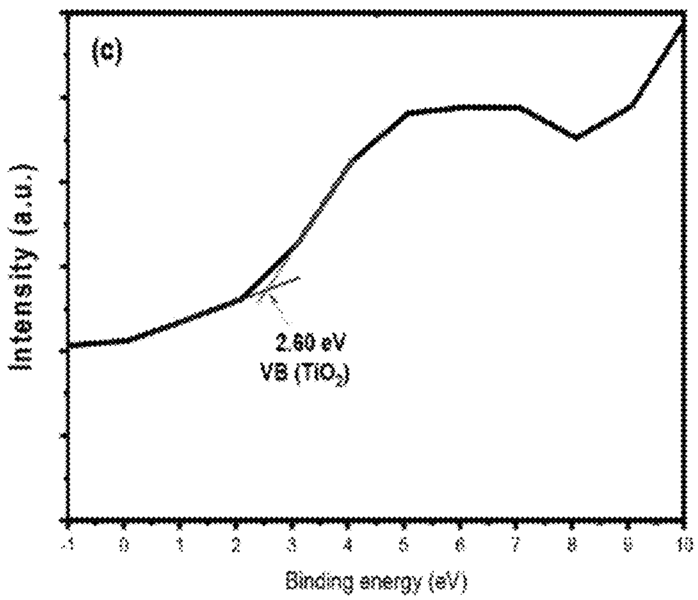
Fig. 8C - Wide spectra for $TiO_2$ VB calculation
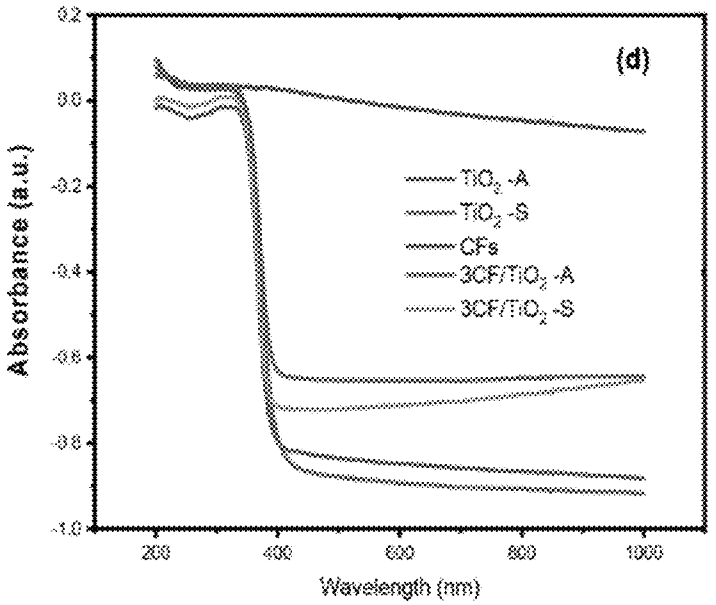
Fig. 9 - UV−vis diffuse reflectance spectra of $TiO_2$, CFs, and their composites

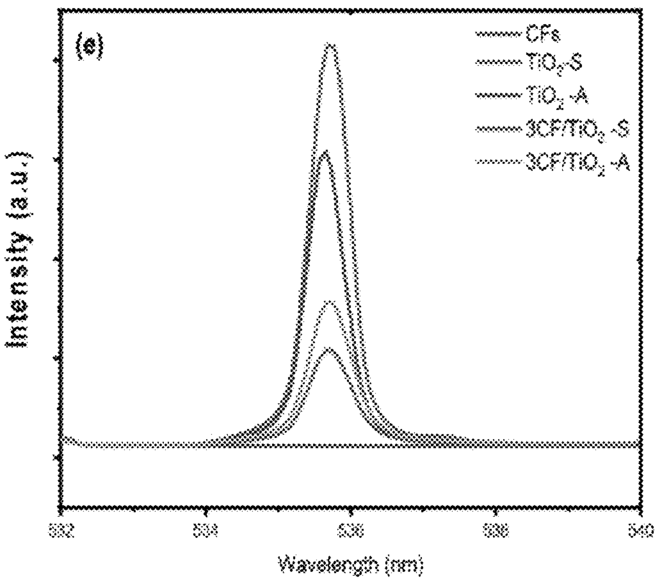
Fig. 10 - PL analysis of CF, $TiO_2$-A, $TiO_2$-S, and CF/$TiO_2$-A and CF/$TiO_2$-S composite samples
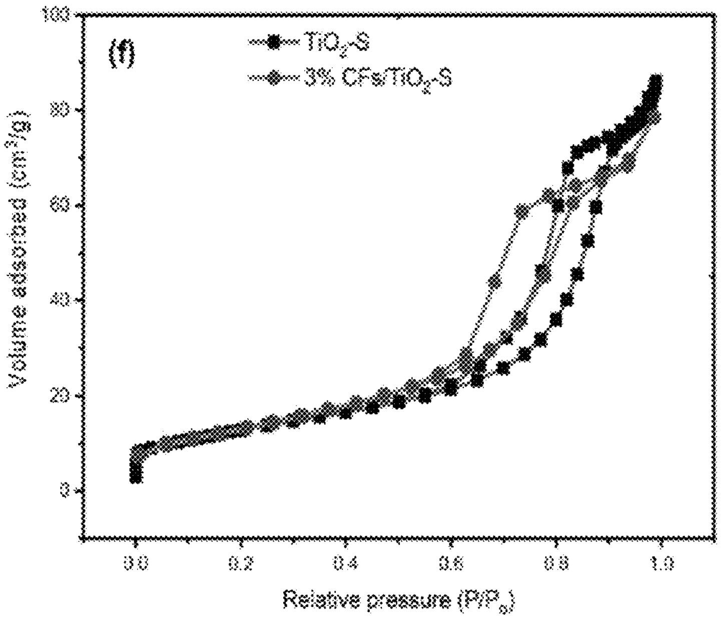
Fig. 11 - $N_2$ adsorption−desorption isotherms of $TiO_2$-S and 3% CF/$TiO_2$-S composite

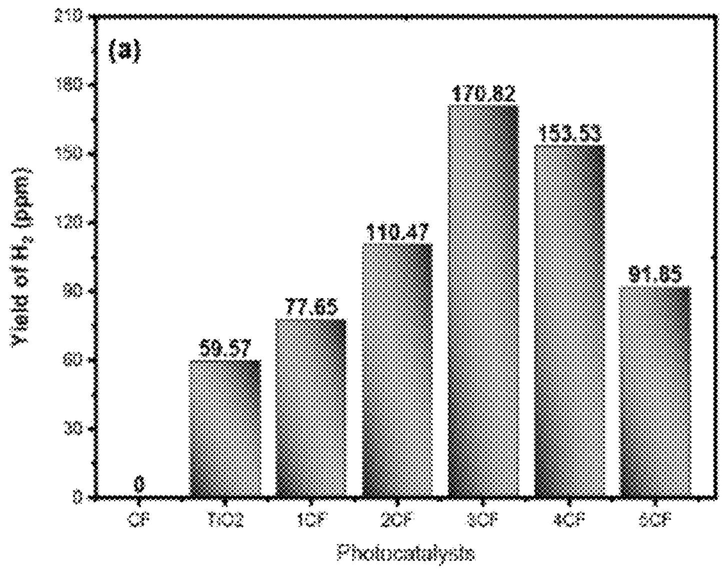
Fig. 12A - Effect of CF-loading on the performance of $TiO_2$-A for photocatalytic H2 evolution in a 5 vol % methanol solution and 100 mg catalyst loading
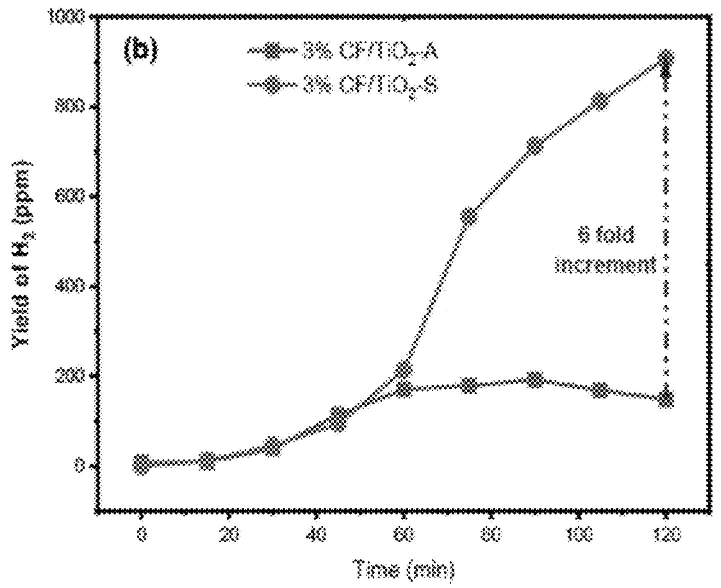
Fig. 12B - Performance comparison of $3CF/TiO_2$-A and $3CF/TiO_2$-S synthesized through sol−gel method for photocatalytic H2 evolution with 5 vol % methanol and 100 mg catalyst loading

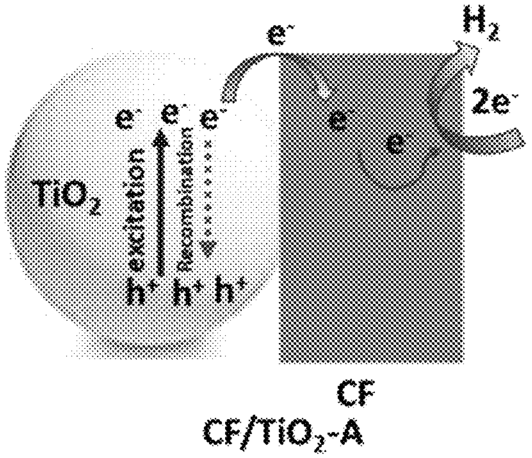
Fig. 12C - Schematic illustration for the generation of H2 for the catalysts synthesized using physical mixing
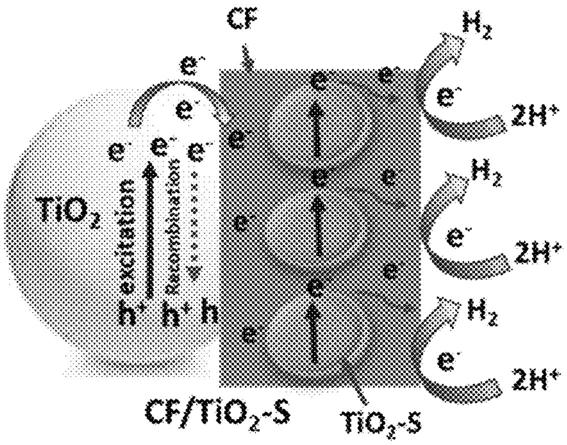
Fig. 12D - Schematic illustration of charge transfer over CFs/$TiO_2$-S produced using sol−gel approach

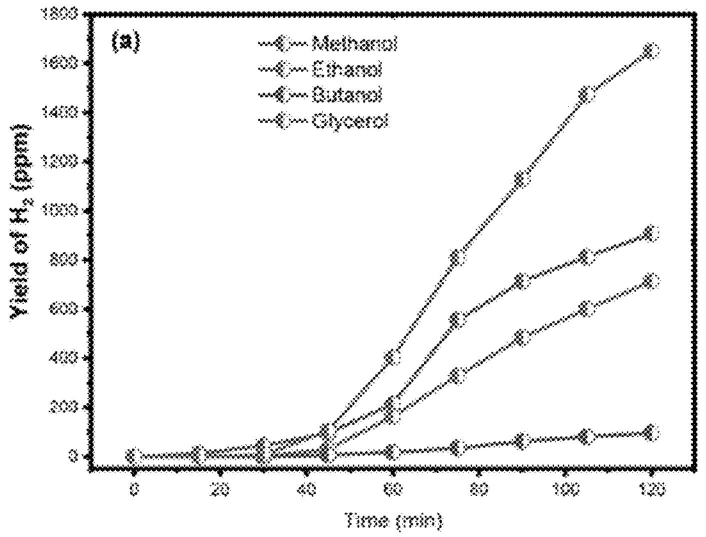
Fig. 13 - Effect of sacrificial reagents on the performance of the 3CFs/$TiO_2$-S composite catalyst
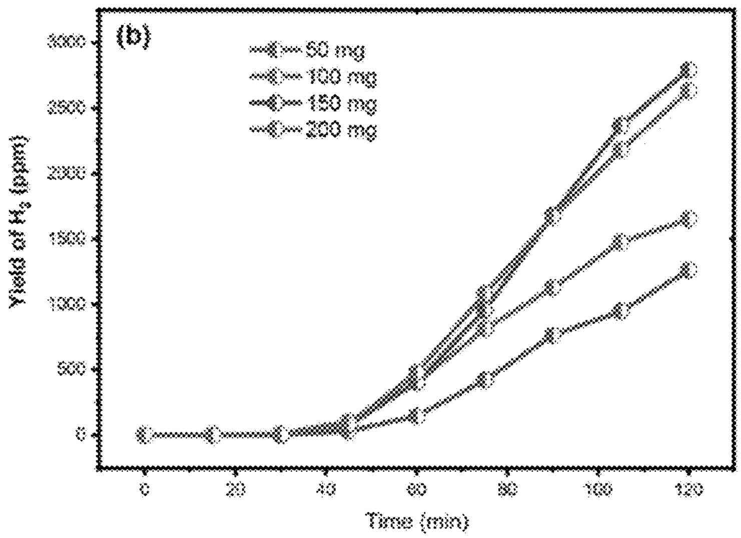
Fig. 14 - Effect of CFs loading on the performance of 3CFs/$TiO_2$-S for photocatalytic $H_2$ evolution using a glycerol sacrificial reagent

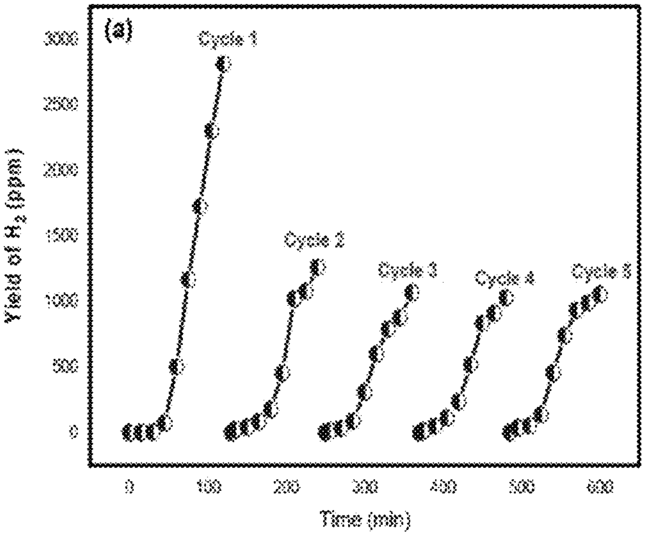
Fig. 15A - Photostability of 3CFs/$TiO_2$-S with 5% glycerol for continuous $H_2$ evolution for 5 consecutive cycles with 150 mg catalyst loading
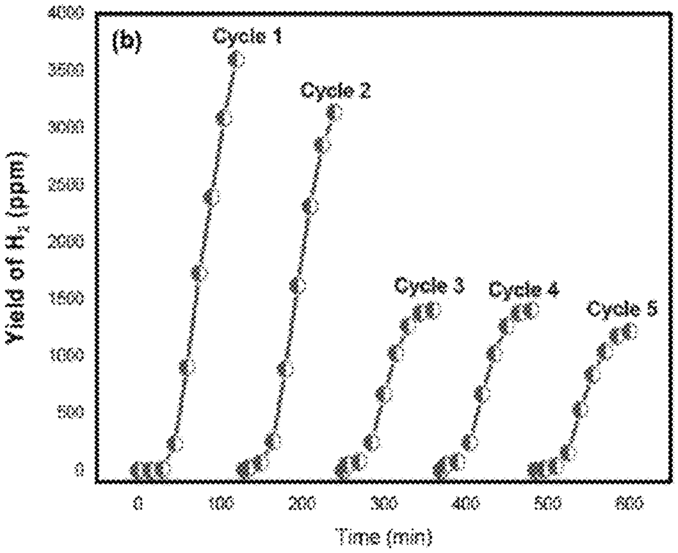
Fig. 15B - Photostability of 3CFs/$TiO_2$-S with 5% methanol for continuous $H_2$ evolution for consecutive 5 cycles with 150 mg catalyst loading

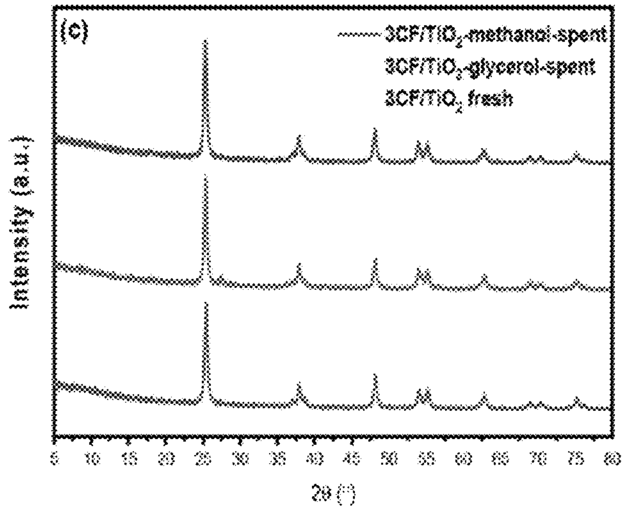
Fig. 16 - XRD analysis of the fresh and the spent catalyst
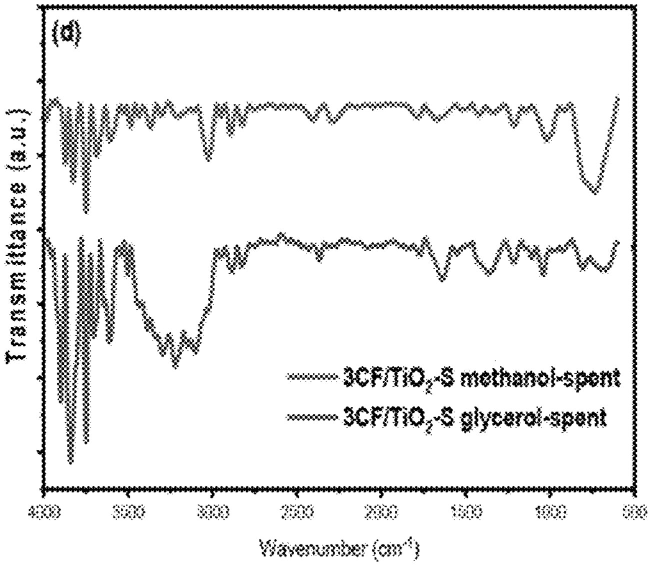
Fig. 17 - FTIR analysis of 3% CFs/$TiO_2$-S composite after the reaction of methanol and glycerol

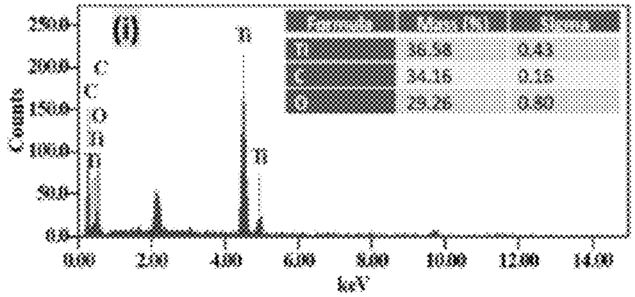
Fig. 18 - EDX spectra of 3CFs/$TiO_2$-S
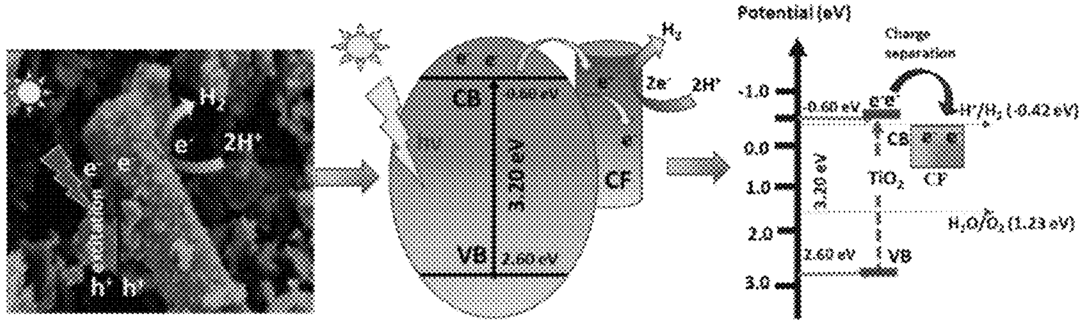
Fig. 19 - Proposed mechanism for photocatalytic $H_2$ evolution over a 3CFs/$TiO_2$-S composite photocatalyst

METHOD AND SYSTEM FOR CONSTRUCTING CFs/$TIO_2$ NANOTEXTURE FROM RECYCLED CARBON FIBER-REINFORCED POLYMERS (CFRPs) FOR PHOTOCATALYTIC HYDROGEN PRODUCTION

CROSS REFERENCE TO RELATED APPLICATION

This application is a divisional of U.S. application Ser. No. 18/601,002 filed 11 Mar. 2024, the entire disclosure of which is incorporated herein by reference.

FIELD OF THE INVENTION

The present invention relates to the field of developing efficient and low-cost semiconductor photocatalysts, and more particularly to a system and method of recycling Carbon Fiber-Reinforced Polymers (CFRPs) waste to produce efficient carbon-fibres (CFs) as a cocatalyst to construct CFs supported titanium dioxide ($TiO_2$) nanotextures.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Hydrogen stands out as a versatile and environmentally friendly energy source with the potential to mitigate the reliance on fossil fuels and curb greenhouse gas emissions. Particularly appealing is the prospect of harnessing solar energy for photocatalytic hydrogen ($H_2$) production, offering a sustainable alternative devoid of carbon dioxide or other harmful pollutants. However, realizing the full potential of this technology necessitates the development of efficient, cost-effective, and stable photocatalysts. A promising photocatalyst should have high efficiency for absorbing light radiation and promoting the desired chemical reaction with good stability.

Among the many semiconductors explored for $H_2$ production, Titanium dioxide ($TiO_2$) emerges as a promising candidate due to its abundance, affordability, chemical stability, non-toxicity, and higher oxidation potential. However, it has some limitations, such as a wide band gap and a high electron-hole recombination rate, which affect its photocatalytic activity.

Various strategies have been explored to enhance the photoactivity of semiconductors, including doping with metals, coupling with cocatalysts, and hybridization with other semiconductors. Notable investigations include Au/$TiO_2$, g-$C_3N_4$-reinforced CdS nanosphere-decorated $TiO_2$, NiS/Pt-loaded $TiO_2$, Pd modified $ZnIn_2S_4$/P25, $Cu_3P$/$TiO_2$, 0D $Co_3O_4$/1D $TiO_2$, and $Ti_3C_2$ MXene@$TiO_2$/$CuInS_2$ composites, aimed at augmenting $TiO_2$'s photocatalytic activity for hydrogen production.

Carbon materials, particularly carbon fibers (CFs), have gained significant attention across industries like aerospace, automotive, and sports due to their remarkable mechanical, thermal, and chemical properties. However, excessive use of Carbon fiber-reinforced polymers (CFRPs) has created environmental concerns due to the generation of scraps and end-of-life components and an economic concern to recycle CFRP waste.

However, despite advancements in this field, there exists a gap in the literature regarding the utilization of CFRP waste for constructing CFs/$TiO_2$ composites with different nanotextures for stimulating photocatalytic hydrogen production.

The present disclosure seeks to overcome one or more of these problems. More specifically, but not exclusively, the present disclosure seeks to provide a solution to overcome the disadvantages and shortcomings of developing composites that may improve semiconductor performance in solar energy-related applications like photocatalytic green hydrogen production.

SUMMARY OF THE INVENTION

Therefore it is an object of the present invention to propose the utilization of carbon fiber-reinforced polymer (CFRP) waste-derived carbon fibers (CFs) coupled with $TiO_2$ for photocatalytic hydrogen production. The CFs are effectively used to enhance visible light absorption and to prevent photoinduced charge carrier recombination during photocatalytic hydrogen production.

In an embodiment of the invention, nanocomposites are synthesized via physical mixing (CFs/$TiO_2$-A) and sol-gel methods (CFs/$TiO_2$-S) to explore the role of interface interaction and morphology.

There is disclosed a method of developing semiconductor photocatalysts by recycling Carbon Fiber-Reinforced Polymers (CFRP) waste, the method comprising the steps of separating or removing a polymer layer of carbon-fibre waste via thermal decomposition; and coupling the resulting carbon-fibres as a cocatalyst with semiconductor materials; wherein combining sewage sludge derived from the CFRP waste with semi-conductors for photocatalytic water splitting results in producing/generating hydrogen ($H_2$).

In an embodiment of the invention, carbon-fibres (CFs) are synthesized by being separated from the polymer layer via thermal decomposition of CFRPs, at low temperatures (400 to 700° C.) and heating times (1 to 4 hours), yielding highly conductive carbon fibers (CFs).

In another embodiment of the invention, the CFs are tailored into various sizes and shapes by eliminating the polymer layer.

In another embodiment of the invention, the CFRP serving as the raw material is subjected to pyrolysis, the method comprising evenly cutting CFRP sheets into smaller sized rectangular shapes (2 to 6 cm length and 1 to 4 cm width); placed in a ceramic crucible; heating the CFRPs in a tube furnace under controlled nitrogen atmosphere for removing polymeric material; and grinding the pyrolyzed product and pulverizing the ground product into fine powder.

In another embodiment of the invention, the controlled nitrogen atmosphere comprises a temperature of 500° C. for 2 hours.

In another embodiment of the invention, pulverizing the ground product into fine powder is done using a planetary ball mill.

In another embodiment of the invention, coupling the resulting carbon-fibres as a cocatalyst with semiconductor materials is done via facile hydrothermal methods such as sol-gel (CFs/$TiO_2$-S) and ultrasonic/physical mixing approaches (CFs/$TiO_2$-A).

In an embodiment, using the sol-gel approach, $TiO_2$ is attached over the entire surface of CFs, enabling interface interaction and charge carrier separation, resulting in enhanced $H_2$ production.

In an embodiment, using the sol-gel approach results in achieving a core-shell structure of nanoparticles with carbon fibres.

In an embodiment, the CFRP waste-derived carbon fibers (CFs) is coupled with $TiO_2$ to construct CFs/$TiO_2$ nanotextures with efficient interface charge transfer for stimulating photocatalytic hydrogen production.

As another aspect of the proposed invention, there is disclosed a carbon fiber (CF)/$TiO_2$ composite comprising well-distributed and uniformly sized $TiO_2$ nanoparticles, wherein the $TiO_2$ particles are uniformly attached to the CF surface, to be used as a composite material for photocatalytic water splitting to produce green hydrogen and $CO_2$ emission reduction, wherein the carbon-fibre (CF) is synthesized by being separated from a polymer layer of Carbon Fiber-Reinforced Polymers (CFRP) waste.

In another embodiment, the $TiO_2$ nanoparticles are spherical shaped, without agglomeration formations.

In an embodiment, the CF/$TiO_2$ composite is synthesized using a facile hydrothermal method such as the sol-gel method.

In an embodiment, the CF/$TiO_2$ composite is synthesized using physical mixing approaches.

In an embodiment, the morphology of the CFs/$TiO_2$ is investigated using methods such as transmission electron microscopy (TEM), X-ray powder diffraction (XRD), Raman spectroscopy and scanning electron microscopy (SEM).

In another embodiment, the CF/$TiO_2$ composite promotes charge separation and visible light absorption during the photocatalysis process.

In an embodiment, glycerol is used as a sacrificial reagent to improve hydrogen ($H_2$) yield.

In an embodiment, an apparent quantum yield (AQY) of 26.3% for $H_2$ production is obtained with 150 mg of catalyst loading under low-intensity light irradiation.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 shows the schematic illustration for the preparation of CFs from CFRPs through thermal decomposition, in accordance with the present invention.

FIG. 2 is a schematic illustration for the physical mixing method for CFs/$TiO_2$ composites, in accordance with an embodiment of the present invention.

FIG. 3 shows the sol-gel method for the synthesis of CFs/$TiO_2$-S composite, in accordance with another embodiment of the present invention.

FIG. 4 shows XRD patterns of CF, $TiO_2$-A, $TiO_2$-S, CF/$TiO_2$-A, and CF/$TiO_2$-S samples.

FIG. 5A shows Raman analysis of CFs according to an embodiment of the present disclosure.

FIG. 5B shows Raman patterns of $TiO_2$-A, $TiO_2$-S, CF/$TiO_2$-A, and CF/$TiO_2$-S samples.

FIG. 6 shows IR patterns of CF, $TiO_2$-A, $TiO_2$-S, CF/$TiO_2$-A, and CF/$TiO_2$-S samples, according to an embodiment of the present disclosure.

FIG. 7A, FIG. 7B, FIG. 7C-7D, FIG. 7E-7F, and FIG. 7G-7H show SEM images of TiO2-A, TiO2-S, CFs, 3CFs/TiO2-A, and 3CFs/TiO2-S respectively, according to the invention.

FIG. 8A and FIG. 8B show XPS spectra of Ti 2p and C 1s respectively.

FIG. 8C shows wide spectra for $TiO_2$ VB calculation, in accordance with an embodiment of the present invention.

FIG. 9 shows UV-vis diffuse reflectance spectra of $TiO_2$, CFs, and their composites.

FIG. 10 is PL analysis of CF, $TiO_2$-A, $TiO_2$-S, and CF/$TiO_2$-A and CF/$TiO_2$-S composite samples, according to an embodiment of the present disclosure.

FIG. 11 shows $N_2$ adsorption-desorption isotherms of $TiO_2$-S and CF/$TiO_2$-S composite.

FIG. 12A presents the effect of CF-loading on the performance of $TiO_2$-A for photocatalytic $H_2$ evolution in a 5 vol % methanol solution and 100 mg catalyst loading, in accordance with an embodiment of the present invention.

FIG. 12B shows performance comparison of 3CF/$TiO_2$-A and 3CF/$TiO_2$-S synthesized through sol-gel method for photocatalytic $H_2$ evolution with 5 vol % methanol and 100 mg catalyst loading.

FIG. 12C is a schematic illustration for the generation of $H_2$ for the catalysts synthesized using physical mixing, according to an embodiment of the present disclosure.

FIG. 12D is schematic illustration of charge transfer over CFs/$TiO_2$-S produced using sol-gel approach, according to another embodiment of the present invention.

FIG. 13 shows the effect of sacrificial reagents on the performance of the 3CFs/$TiO_2$-S composite catalyst.

FIG. 14 shows the effect of CFs loading on the performance of 3CFs/$TiO_2$-S for photocatalytic $H_2$ evolution using a glycerol sacrificial reagent.

FIG. 15A presents photostability of 3CFs/$TiO_2$-S with 5% glycerol for continuous $H_2$ evolution for 5 consecutive cycles with 150 mg catalyst loading, according to an embodiment of the present invention.

FIG. 15B presents photostability of 3CFs/$TiO_2$-S with 5% methanol for continuous $H_2$ evolution for consecutive 5 cycles with 150 mg catalyst loading, according to another embodiment of the present invention.

FIG. 16 shows XRD analysis of the fresh and the spent catalyst.

FIG. 17 shows FTIR analysis of 3% CFs/$TiO_2$-S composite after the reaction of methanol and glycerol.

FIG. 18 shows EDX spectra of 3CFs/$TiO_2$-S.

FIG. 19 illustrates proposed mechanism for photocatalytic $H_2$ evolution over a 3CFs/$TiO_2$-S composite photocatalyst, according to the present invention.

DETAILED DESCRIPTION OF THE INVENTION

The aspects of the proposed system and method for recycling CFRPs to produce CFs as cocatalyst to be coupled with $TiO_2$ for efficient photocatalytic $H_2$ production-according to the present invention will be described in conjunction with FIGS. 1-19. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Hydrogen is a versatile and clean energy source. The utilization of solar energy for generating hydrogen ($H_2$) through photocatalytic water splitting has emerged as a highly promising technology, that offers a sustainable solution for renewable fuel production with reduced carbon dioxide ($CO_2$) emissions. This technology, however, requires the development of efficient, low-cost, and stable photocatalysts. The proposed invention explores solid waste carbon materials such as carbon fibre-reinforced polymers (CFRPs) to be utilized as an efficient cocatalyst for photocatalytic green $H_2$ production using solar energy. In this process, novel low-cost nanomaterials of tenable size and shape are synthesized using a temple-free route and are characterized for applications. These newly developed composites are found very efficient for producing hydrogen and $CO_2$ reduction via low-intensity solar energy for renewable fuels.

The present invention discloses highly efficient and low-cost semiconductor photocatalysts, and more particularly to CFs-based cocatalysts produced from recycled carbon fiber-reinforced polymer (CFRP) waste for solar energy applications, particularly in photocatalytic hydrogen production. These waste-derived CFs can be combined as a cocatalyst with different semiconductors to be used as composite materials. In an embodiment, carbon fiber-reinforced polymer (CFRP) waste-derived carbon fibers (CFs) is coupled with $TiO_2$ to construct CFs/$TiO_2$ nanotextures with efficient interface charge transfer for stimulating photocatalytic hydrogen production. Coupling with CFs is achieved using sol-gel and ultrasonic approach. The newly developed composites exhibit a notably enhanced photoactivity and stability, in comparison to the semiconductors.

The invention also relates to a method of recycling CFRP waste to produce CFs as a cocatalyst to construct CFs/$TiO_2$ nanotextures for photo-catalytic hydrogen production and other solar energy-related applications. The method proposes to produce carbon fibres using solid waste materials comprising CFRPs using a facile hydrothermal method. The solid CFRP waste can be converted to pure carbon fibers (CFs) which can be used as highly conductive materials in semiconducting applications. In an embodiment of the invention, the Carbon fibres (CFs) are synthesized/obtained through a low-cost and easy method, wherein they are separated from the polymer layer via thermal decomposition of CFRPs. The process of thermal decomposition at low temperatures yields highly conductive carbon fibers, which can be tailored into various sizes and shapes by eliminating the polymer layer.

When combined with semiconductors, CFs augment the photoactivity of semiconductors by improving visible light absorption and preventing the recombination of photoinduced charge carriers. This is because CFs are a metal-free source to trap and transport electrons within the semiconductor. Carbon fibers coated with $TiO_2$ thus, enhances hydrogen production in photocatalytic water splitting due to the narrowed band gap energy and efficient separation of photogenerated electron-hole pairs. In addition, they can be used as cocatalysts because of their high surface area, great electrical conductivity, affordability, and reusability. The CF-supported composites are also strong and durable with improved photostability.

The role of interface interaction and morphology is investigated by synthesizing nanocomposites through physical mixing (CFs/$TiO_2$) and sol-gel methods (CFs/$TiO_2$-S). The optimized 3CFs/$TiO_2$ produces 2.87 times more hydrogen than using only $TiO_2$. This noticeable enhancement is due to efficient charge separation in the presence of CFs with high visible light absorption. Comparatively, the CFs/$TiO_2$-S nanotexture produces $H_2$ at 2268.4 $\mu$mol $g^{-1}$ $h^{-1}$, which is 6-12 fold greater than that for CFs/$TiO_2$ and pristine $TiO_2$ samples. Using the sol-gel approach, $TiO_2$ is effectively attached over the entire surface of CFs, enabling good interface interaction and efficient charge carrier separation, resulting in significantly enhanced $H_2$ production. Among the various operating parameters, glycerol as a sacrificial reagent promisingly improves $H_2$ yield, whereas it has a lower photostability than methanol after five consecutive cycles. The highest AQY of 26.3% for $H_2$ production is obtained with 150 mg of catalyst loading under low-intensity light irradiation.

The Carbon fibres (CFs) are synthesized/obtained through thermal decomposition of CFRPs, wherein they are separated from the polymer layer. The process of thermal decomposition at low temperatures yields highly conductive carbon fibers, which can be tailored into various sizes and shapes by eliminating the polymer layer. The schematic illustration for the synthesis of CFs using CFRPs is demonstrated in FIG. 1. The CFRPs serving as the raw material, is subjected to pyrolysis, the method involving evenly cutting the CFRPs sheets into a smaller size rectangular shape and heating the specific amount of CFRPs (placed in a ceramic boat) in a tube furnace under controlled nitrogen atmosphere at 500° C. for 2 h to remove polymeric material. This is followed by grinding the pyrolyzed product into small pieces and then pulverizing into fine powder using a planetary ball mill. In the experimental set up, the planetary ball mill PM100 is used. The one-dimensional carbon fibers (1D CFs) are synthesized using CFRP waste sheets.

In another embodiment of the invention, the CFRP serving as the raw material is subjected to pyrolysis, the method comprising evenly cutting CFRP sheets into smaller sized rectangular shapes (2 to 6 cm length and 1 to 4 cm width); placed in a ceramic crucible; heating the CFRPs in a tube furnace under controlled nitrogen atmosphere for removing polymeric material; and grinding the pyrolyzed product and pulverizing the ground product into fine powder.

In accordance with the present invention, CFs are coupled with $TiO_2$ through self-hybridization, and the photoactivity for $H_2$ production is tested with various CFs-loading. The role of interface interaction and morphology is investigated by synthesizing nanocomposites through physical mixing (CFs/$TiO_2$-A) and sol-gel methods (CFs/$TiO_2$-S). The chemicals and materials used for experiments are titanium (IV) isopropoxide (TTIP, purity 97%, Merck), acetic acid ($CH_3COOH$, MW=60.05 g/mol, 99.8%), 2-propanol (MW=60.1 g/mol, CH2CH(OH)CH3, Merck), (titanium-(IV) oxide, anatase powder, 99.8%, Sigma-Aldrich), methanol (Merch, 99.8%), and carbon fiber-reinforced plastic.

In an embodiment of the present invention, the CFs/$TiO_2$ anatase composite is synthesized using the anatase phase of $TiO_2$ (titanium (IV) oxide, anatase powder). A direct physical mixing method is used to fabricate the CF-modified $TiO_2$ catalyst. The physical mixing method for CFs/$TiO_2$ composites is illustrated in FIG. 2. By using a single phase of mixing, different CF loadings onto $TiO_2$ are synthesized. Typically, methanol and $TiO_2$ are mixed for 2 h at room temperature. Subsequently, CFs with specific amounts are added and mixed for an additional 2 h to achieve good dispersion and interface interaction. The samples are subsequently dried (in an oven) for 24 h at 100° C. and are named as CFs/$TiO_2$ Anatase (CFs/$TiO_2$-A). Using the same procedure, varying CF loadings (1, 2, 3, 4, and 5 wt %) are added to $TiO_2$ suspension and given the label xCF/$TiO_2$-A, where x is the loading (1, 2, 3, 4, and 5 wt %). Carbon fiber loading and titanium dioxide anatase are denoted here by the acronyms xCF and $TiO_2$-A, respectively.

In another embodiment of the present invention, the CFs loaded over $TiO_2$ to get a good interface interaction are synthesized using the facile sol-gel approach. The scheme for the synthesis of various CF-based composites by sol-gel method is presented in FIG. 3. The precursor used for the synthesis of $TiO_2$ is titanium (IV) isopropoxide (TTIP). Typically, 10 mL of TTIP dispersed in 2-propanol is hydrolyzed using acetic acid (1 M) to get titanium sol. To get well-dispersed carbon fibers, CFs are added to the above titanium sol while it is being stirred, and this procedure is maintained for an additional 12 h to produce a thick titanium sol. Finally, the slurry is oven-dried at 100° C. for 24 h and heated at 500° C. for 2 h to get CFs/$TiO_2$ Sol-Gel (CFs/$TiO_2$-S) composite. The same process is used to synthesize $TiO_2$, but without the inclusion of CFs.

Another aspect of the proposed invention includes testing the synthesized CFs/$TiO_2$ composites with various CFs-loading for photoactivity for $H_2$ production. The performance of CFs/$TiO_2$ composites synthesized through physical mixing is compared against composites synthesized using sol-gel. Comparatively, CFs/$TiO_2$-S produced using the sol-gel method is more efficient due to good interface interaction and efficient charge carrier separation. Core-shell structure of nanoparticles with carbon fibres is achieved using the sol-gel method. In an embodiment of the invention, the performance of the CFs/$TiO_2$-S nanotexture is tested under various parameters and sacrificial reagents to maximize the hydrogen yield. Using glycerol as a sacrificial reagent with an optimized 3% CF loading results in the highest $H_2$ yield at lower catalyst loading levels. The photostability of the composite is evaluated over five consecutive cycles using glycerol and methanol as sacrificial reagents. With these findings, the nanocomposite can be optimized to improve its photocatalytic performance with the use of solid waste materials. The spent catalyst is further characterized to propose a mechanism for photocatalytic $H_2$ evolution over CFs/$TiO_2$ composite photocatalyst based on experimental and characterization outcomes.

In accordance with the present invention, the catalyst is characterized by using several analytical methods. The various analytical methods, experimental set up including the instruments for enabling the analytical characterization are described. In an embodiment of the present invention, the purity and crystal phase structures are examined using X-ray powder diffraction (XRD). To establish the interaction between the composite materials, Raman examination is carried out by using a scientific spectrophotometer (laser at 532 nm). Using scanning electron microscopy (SEM, JEOL), the structure and morphology are obtained. Transmission electron microscopy (TEM) is used to further explore the structure and morphology. The elemental state and composition are further assessed using XPS measurements (Axis Ultra DLD Shimadzu). A UV-visible diffuse reflectance spectrometer (DRS) is used to analyze the materials' optical response (V-750 UV-Visible Spectrophotometer). Spheres are used to load powder samples before the analysis. The PL (photoluminescence) analysis is carried out using confocal micro-PL spectroscopy (Mode FEX-u) with a laser of wavelength 532 nm. The BET surface area is estimated using $N_2$ adsorption-desorption isotherms. Fourier-transform infrared spectroscopy (FTIR-4700, JASCO) is also used to understand the interaction of bonding and surface groups.

The present invention discusses the results of the analytical methods employed on catalytic sample. The XRD patterns of CFs, $TiO_2$ and CF-loaded $TiO_2$ samples are presented in FIG. 4. The peak at 20 of 25.15° is ascribed to the crystalline phase of amorphous CFs with diffraction crystal plane (002), corresponding to the hexagonal primitive structure of carbon (JCPDS card no. 89-8487). This shows the polymer layer is successfully removed from the carbon fiber-reinforced polymers (CFRPs). The XRD patterns of $TiO_2$-A show peaks at 20 of 25.39°, 37.87°,48.05°, 53.96°, 55.21°, and 62.76° indexed to (101), (004), (200), (105), (211) and (204) facets, respectively (JCPDS card no. 21-1272) and confirms anatase $TiO_2$. In the case of $TiO_2$-S produced by the sol-gel method, similar peaks are obtained but with their lower crystallinity. An additional peak appears at 20 of 27.55°, which is due to the formation of the rutile phase in $TiO_2$. In the case of CF/$TiO_2$-A, all the diffraction peaks of $TiO_2$-A appear; however, a peak belonging to CF does not appear due to their identical 20 peaks. Similarly, all the peaks of $TiO_2$-S are present in the CF/$TiO_2$-S composite, and no additional peaks appear. These findings confirm successful fabrication of CF-loaded $TiO_2$ composites using both the physical mixing and sol-gel methods.

FIG. 5A shows Raman spectroscopy of pure CF, in which two high-intensity peaks are obtained at 1359.5 and 1599.1 cm 1, depicted as the D and G bands of CF. The Raman spectra of $TiO_2$-A, $TiO_2$-S, and CF-loaded $TiO_2$ samples are presented in FIG. 5B. The Raman peaks for the $TiO_2$-A appear at 141.1, 196.4, 397.1, 517, and 639.2 cm 1, which corresponds to pure anatase phase of $TiO_2$. For the case of $TiO_2$-S, the Raman spectroscopy peaks are obtained at 142.8, 196.8, 396.2, 517, and 640.9 cm 1. When CF is added to $TiO_2$-A, the main peak appears at 142.3 cm 1, which confirms a good interaction between $TiO_2$-A and CFs samples, confirming their successful fabrication. When CFs are loaded to $TiO_2$-S, similar patterns are obtained, which confirms successful fabrication of CF-based $TiO_2$ composites without any change in phase structure and without the presence of any other impurity.

The FTIR analysis of CF, $TiO_2$, and CF/$TiO_2$ samples is presented in FIG. 6. In the case of pure CF, no obvious peaks are obtained. The obvious vibration peaks at 2351 and 3739 cm 1 is ascribed to C—H and hydroxyl bands, respectively. For the case of $TiO_2$-S, Ti—O—Ti vibrational frequencies appear at 517 and 703 cm 1 and hydroxyl peaks appear at 1632 and 3439 cm 1. For the case of $TiO_2$-A, the band at 726 cm 1 belongs to the Ti—O—Ti vibrational frequency. In the case of CF-loaded $TiO_2$ composites, similar patterns are obtained.

The morphology of CF, $TiO_2$, and CF/$TiO_2$ samples is obtained through scanning electron microscopy (SEM). The $TiO_2$ anatase shows uniform size $TiO_2$ particles as shown in FIG. 7A. However, when the sol-gel method is used, agglomerated $TiO_2$ particles are obtained, as evidenced from FIG. 7B. All the particles are agglomerated together, whereas they have uniform size and shape. FIG. 7C-7D show the morphology of pure CFs. On analyzing the morphology of pure CFs, it is observed that large size carbon fibers are obtained, whereas the presence of other material is also identified, which would be due to breaking of large size fibers during grinding process of carbon fiber sheets. More importantly, fibers are covered with the amorphous materials as shown in FIG. 7D. The morphology of CF/$TiO_2$-A is presented in FIG. 7E-7F. It is noticed that CFs are well mixed with the $TiO_2$ particles, as shown in FIG. 7E. However, the high-resolution image in FIG. 7F shows that $TiO_2$-A is not spread uniformly over the entire surface of the CFs. This is possibly due to using a physical mixing approach, which is not successful to attach both the materials uniformly. Furthermore, the morphology of the CFs/$TiO_2$-S composite, synthesized using the sol-gel method, as shown in FIG. 7G, presents that all of the $TiO_2$ particles are uniformly attached to the CF surface, with good interface interaction. The high-resolution image in FIG. 7H further confirms that the CF surface is entirely covered by the $TiO_2$ particles. Overall, the findings confirm successful fabrication of the CF/$TiO_2$-S composite, which is expected to promote interface charge carriers.

The morphology of the CFs/$TiO_2$-S is further investigated using transmission electron microscopy (TEM). The morphology of $TiO_2$ shows that all the $TiO_2$ particles are spherical in shape and well-distributed, confirming no agglomeration formation. Furthermore, uniformly sized $TiO_2$ NPs are attached to carbon fibers synthesized through sol-gel method. Evidently, carbon fibers are entirely covered by $TiO_2$ NPs, confirming good interface interaction between both materials. This is beneficial to promote charge separation during the photocatalysis process.

XPS examination is done to determine the elemental state of the CFs/$TiO_2$-S composite. FIG. 8A shows the results of Ti 2p high-resolution spectra with two obvious peaks positioned at 458.1 eV (Ti 2p3/2) and 463.9 eV (Ti 2pl/2), confirming the existence of titanium as $Ti^{4+}$ or $TiO_2$. The XPS spectra of C Is in FIG. 8B shows three peaks with binding energies 284.6, 286.1, and 288.2 eV, which are associated with C—C, C—O, and C═O bonds, respectively. This reveals that the CFs/$TiO_2$-S composite is successfully synthesized using a single-step sol-gel process. The survey spectrum in FIG. 8C is used to calculate the valence band position of $TiO_2$ which gives an estimated value of 2.60 eV ($TiO_2$ VB).

FIG. 9 shows UV-vis diffuse reflectance absorbance spectra of CF, $TiO_2$-A, $TiO_2$-S, CF/$TiO_2$-A and CF/$TiO_2$-S composite samples. The pure CFs has high light absorption in the visible region, which is evidently due to its high light absorbance capacity because of black color and higher conductivity. Comparatively, $TiO_2$-A shows higher light absorption in the visible region, whereas $TiO_2$-S has lower light absorption. This is possibly due to its large size particles, which have less light absorption efficiency compared to $TiO_2$ nanoparticles. The light absorption efficiency of $TiO_2$-S in the visible region is significantly increased when it is coupled with CFs. The CF/$TiO_2$-A composite, however, achieves the maximum light absorption in the visible region. As a result, the inclusion of CF in composites clearly increases their absorption in the visible light region, which is advantageous for increasing the activity of the photocatalyst. The results indicate that the presence of CFs in $TiO_2$ further enhances the light absorption efficiency, which is expected to improve the photocatalytic activity of the composite.

The band gap energy of the materials is calculated using Equation (1). The wavelengths of 387.8 and 383.3 eV are obtained for the $TiO_2$-S and 3CFs/$TiO_2$-S samples, giving band gap energies of 3.20 and 3.24 eV for the $TiO_2$-S and 3CFs/$TiO_2$-S samples, respectively. Previously, it was reported that CF did not display any absorption peak; however, when it is coupled with $TiO_2$, band gap energy gets reduced from 3.1 and 2.76 eV. However, in the current invention, band gap energy gets increased, which is due to increasing interface interaction through the use of the sol-gel method. The conduction band position is calculated using band gap energy and VB position of $TiO_2$ according to Equation (2).

$$E_{bg} = \frac{1240}{\lambda} \tag{1}$$

-continued $$E_{CB} = E_{bg} - E_{VB} \tag{2}$$

Using Equation (2) with $E_{VB}$ of 2.60 eV and $E_{bg}$ of 3.20 eV, the $E_{CB}$ of −0.60 eV is obtained. Overall, the analysis of absorbance spectra suggests that the composites have the potential to be effective photocatalysts, particularly for applications that require visible light activation. The CB value is promising to enhance reduction reaction for the production of hydrogen.

Photoluminescence (PL) studies are used to look at the effectiveness of electron-hole pair separation. In general, a high photoluminescence intensity is associated with low photocatalytic activity and high electron-hole pair recombination efficiency. FIG. 10 shows PL analysis of CF, $TiO_2$-A, $TiO_2$-S, CF/$TiO_2$-A, and CF/$TiO_2$-S composite samples. In the case of pure CF, the lowest PL intensity is obtained, which is probably due to conductive characteristics and because of the blackish color. Using pristine $TiO_2$-S, the highest PL intensity is observed, whereas $TiO_2$-A shows lower PL intensity. This is most likely caused by large-sized $TiO_2$ particles, which have a greater rate of charge recombination than smaller $TiO_2$ particles. The PL intensity clearly decreases in the case of CF/$TiO_2$-A, which is evidently caused by the presence of CF, which inhibits the rate of charge recombination. Furthermore, ta sol-gel process is used to synthesize the CF/$TiO_2$-S composite, which results in the lowest PL intensity yet recorded. This may have been brought about by effective charge carrier separation inside the CF/$TiO_2$-S composite because of good interface contact between the two materials. As a result, the PL peak intensity has been significantly decreased, which suggests that CF is be able to prevent photoelectrons and holes from recombining. In many reports, decreased PL intensity of a semiconductor has been reported when coupled with other materials as cocatalyst. The PL spectrum of $TiO_2$/CF has been recently reported to be much lower than that of pristine $TiO_2$, indicating effective separation of electron-hole pairs. Similar to this, less PL intensity is seen when g-$C_3N_4$ and $Ti_3C_2$ are connected because the charge carriers separated more quickly. Another study found that the quicker charge separation caused the g-$C_3N_4$/$Ti_3C_2$ composite to have a lower PL intensity. These results all support the idea that CF can function as a cocatalyst and that photogenerated electrons can be effectively transported from $TiO_2$ to CF, which is beneficial to stimulate the hydrogen production efficiency.

To further study the BET specific surface area and pore volume, nitrogen adsorption-desorption isotherm analysis is performed. FIG. 11 shows the isotherms of $TiO_2$ and 3% CFs/$TiO_2$-S samples, which belong to type IV with $H_3$ hysteresis loops, confirming the presence of a mesoporous structure. The BET surface area and BJH pore volume of all the samples are summarized in Table 1. Pure $TiO_2$ has a BET surface area of 43 $m^2/g$, whereas loading CFs to $TiO_2$ has reduced the specific surface area to 16 $m^2/g$. This decrease in BET surface area is probably due to lower surface area of CFs because the polymeric layer is not completely removed, thus acting only as a support for the $TiO_2$. Comparatively, the pore volume of pure $TiO_2$ is 0.060 $cm^3/g$, which is increased to 0.10 $cm^3/g$ when 3% CF is added to $TiO_2$. This reveals that CFs do not support increased BET surface area but they are beneficial to increased total pore volume. Previously, commercial CFs/$TiO_2$ composite was tested and reported a much higher surface area of the composite (716.8 $m^2/g$) compared to pure $TiO_2$ (54 $m^2/g$). In the present invention, an increase in photocatalytic activity would not be due to increasing BET surface area, but it would be due to proficient charge carrier separation as evidenced by PL analysis.

TABLE 1

Summary of BET Surface Area and Pore Volume of $TiO_2$-S and the 3% CFs/$TiO_2$-S Composite

| Catalyst | BET surface area ($m^2$/g) | BJH pore volume ($cm^3$/g) |
|---|---|---|
| $TiO_2$ | 43 | 0.060 |
| 3% CFs/$TiO_2$ | 16 | 0.122 |

In an embodiment of the present invention, photoactivity test is performed on the synthesized composites. The performance of pure $TiO_2$ and carbon fiber-based nanocomposite is examined using a slurry phase Pyrex glass photoreactor system with a double cylinder having a total volume of 120 mL. A 35 W xenon lamp served as the visible light source with a light intensity of 20 mW/$cm^2$. A 100 mg sample of the photocatalyst is disseminated in a 5 vol % aqueous solution of methanol and homogenized by magnetic stirring. Utilizing a vacuum flow system and constant nitrogen flow, the reactor and piping system are cleaned, and the efficiency is determined based on the amount of hydrogen produced. Several loadings of catalysts (50-200 mg) are used in a 100 mL solution of 95 mL deionized water and 5 mL methanol, and the mixture is constantly agitated on a magnetic stirrer. In different embodiments, in order to investigate the effect of sacrificial reagents, various sacrificial reagents such as methanol, ethanol, butanol, and glycerol are used with the concentration of 5 vol %.

The online micro-GC (fusion) is integrated with the reactor for the continuous analysis of the amount of $H_2$ produced. The GC instrument is installed with two TCDs connected with argon and helium carrier gases, and products are injected into the GC instrument after a 15 min interval. Following the evaluation of photocatalytic hydrogen production activities, a stability test is conducted for a total of 5 cycles of 2 h each. For 1 h after and before each experiment, $N_2$ gas is flown through the reactor. The used catalyst after five cycles is dried at 100° C. for 24 h before further characterization analysis. The results of photocatalytic test for hydrogen production are discussed in the following sections.

In a slurry photoreactor with 5% methanol as the sacrificial reagents and 100 mg of catalyst loading, the performance of $TiO_2$-A and CF/$TiO_2$-A with varied CF loadings (1 to 5 wt %) is tested. FIG. 12A shows photocatalytic $H_2$ production over different CF-loaded $TiO_2$-A samples. In the presence of pure CFs, production of hydrogen is not detected due to its conductive characteristics. Using pure $TiO_2$-A, the $H_2$ yield of 59.57 ppm is produced after 2 h of irradiation time. When $TiO_2$-A is coupled with a very small amount of CF (1 wt %), the hydrogen yield gets increased to 77.65 ppm. The highest $H_2$ production of 170.82 ppm is obtained with a 3% CF/$TiO_2$-A composite. This amount of $H_2$ production is 2.87-fold higher than using pristine $TiO_2$-A. Due to the CFs' conductive properties, which effectively separate photoinduced electrons and holes over the $TiO_2$ surface, there is a notable increase in hydrogen productivity. However, any loading of CF above 3 wt % has adverse effect on the hydrogen evolution, whereas the lowest $H_2$ yield is obtained with 5 wt % CF loading with $TiO_2$-A. These trends can be explained based on charge production and separation and their recombination over the CF/$TiO_2$-A composite. At lower CF loading, more electrons are trapped by CF due to its higher conductivity and good interaction with the $TiO_2$-A surface. However, when CF-loading is increased above the optimized value, more CFs interact with each other instead of $TiO_2$, resulting in recombination of charges transferred toward the CF surface. Another important factor can be the lower surface area of $TiO_2$-A available for producing photoinduced charge carriers. In both possibilities, lower photoinduced charge carriers will be available for oxidation and reduction reactions; thus, a lower $H_2$ yield is produced.

Further research into the performance of CF-loaded $TiO_2$ is conducted by utilizing several synthesis techniques, including the physical mixing of CFs and $TiO_2$-A to prepare 3CFs/$TiO_2$-A and the sol-gel approach to produce nanotextures of CFs/$TiO_2$-S. FIG. 12B displays the comparison of these photocatalytic systems with 5 vol % methanol and 100 mg of catalyst loading. Using 3CFs/$TiO_2$-A, the hydrogen production gets decreased after 60 min of irradiation time. However, in the case of 3CFs/$TiO_2$-S, produced with the sol-gel method, a continuous yield of $H_2$ is obtained over the entire irradiation time. Initially, for the first 40 min, the lower yield of $H_2$ is obtained, which gets significantly increased after 60 min. The lower amount of hydrogen production at the beginning could be possible due to the existence of an activation process in the CFs/$TiO_2$ composite, which can strengthen the interaction between $TiO_2$ and CFs under continuous stirring. Another possible reason could be due to using continuous process with online injection of samples to the GC system after a 15 min interval. In this case, there is no accumulation of hydrogen in the reactor and pipelines which are connected to the GC instrument.

Using optimized 3% CFs/$TiO_2$-S, $H_2$ production reaches a maximum amount of 907 ppm after 2 h of irradiation time, which is 6-fold more than is produced using the same CF loading but with $TiO_2$-A through a physical mixing approach (3CFs/$TiO_2$-A). According to SEM analysis, there is no good interface interaction between CF and $TiO_2$ using the physical mixing method; thus, CFs are not well connected with $TiO_2$, enabling lower transfer of electrons, resulting in trivial photocatalytic activity for $H_2$ production. For the sol-gel method, CFs are entirely covered with $TiO_2$ particles, resulting in the efficient transfer of electrons to maximize the yield of $H_2$.

The schematic illustration for photocatalytic $H_2$ evolution over 3CFs/$TiO_2$-A and 3CFs/$TiO_2$-S is presented in FIG. 12C and FIG. 12D. The interaction between the cocatalyst and the semiconductor is important to effectively transfer electrons during the photocatalytic process. In the current case, CFs work as the sink, and electrons are transferred from $TiO_2$ to CFs due to their higher conductive characteristics. However, due to lower interface interaction in CFs/$TiO_2$-A, the process of charge transfer is not efficient, as illustrated in FIG. 12C. On the other hand, using CFs/$TiO_2$-S, $TiO_2$ particles are entirely and uniformly attached to CFs to give good interface interaction as shown in FIG. 12D. Due to the good interface interaction between CFs and $TiO_2$-S, efficient charge transfer would be possible, which enables 6-fold increments in $H_2$ yield compared to using CFs/$TiO_2$-A composite. CF/$TiO_2$ is tested for photocatalytic water splitting and results in an enhanced photoactivity of $TiO_2$ with CF loading due to increased BET surface area, higher visible light absorption, and efficient charge carrier separation. In the current invention, enhanced photocatalytic $H_2$ production is obviously due to higher light absorption and proficient charge carrier separation.

Sacrificial reagents are known to be crucial in water splitting applications; hence, the performance of the improved $3CFs/TiO_2$-S is further examined utilizing a variety of sacrificial reagents. In different embodiments of the invention, the sacrificial reagents employed comprises methanol, ethanol, butanol, and glycerol with 5 vol % concentration and 100 mg catalyst loading, and results are presented in FIG. 13. Using pure water, production of hydrogen is not significant, due to more charge recombination and the unavailability of protons to promote hydrogen evolution. However, when sacrificial reagents of 5 vol % are used with water, a significant amount of $H_2$ is produced. This is because sacrificial reagents have a major impact on the photocatalyst activity and serve as hole scavengers. Obviously, using different types of sacrificial reagents has different effects: the highest $H_2$ yield is obtained using glycerol, and the lowest amount of $H_2$ is produced with butanol. With $3CFs/TiO_2$-S, glycerol produces the largest amount of $H_2$ (1650 ppm), which is 1.8, 2.3, and 17.2 times more than those of methanol, ethanol, and butanol, respectively. Generally speaking, standard oxidation potential and the quantity of OH bonds all have a significant impact on $H_2$ generation. Alcohols enhances polarity and thus have a favorable impact on $H_2$ evolution. In the order of butanol ($C_4H_{10}O$), ethanol ($C_2H_6O$), methanol ($CH_4O$), and glycerol ($C_3H_8O_3$), $H_2$ generation is seen to rise. Furthermore, α-hydrogen atoms present in alcohols enable more $H_2$ production. The molecular structures of glycerol and methanol consist of more carbon atoms attached to α-hydrogen atoms; thus, they are more favorable to enhance $H_2$ production. Previously, when investigated various sacrificial reagents and found hydrogen production in the order TEOA>methanol>glycerol. The discrepancy of the results in the current invention is due to using $TiO_2$, which has more potential to absorb glycerol compared to g-$C_3N_4$ which has more potential to absorb TEOA and methanol than glycerol.

In photocatalysis, catalyst type, catalyst loading, type of reactor, and light intensity are the influential parameters responsible for maximizing the amount of $H_2$ evolution. Therefore, glycerol is used as the sacrificial agent while the performance of improved $3CFs/TiO_2$-S is further examined, and the findings are described in FIG. 14. With 50 mg of the catalyst, 1260 ppm of $H_2$ production is obtained, whereas $H_2$ yield gets further increased when catalyst loading is increased to 100 mg (1651 ppm), which is 1.31 times more than using 50 mg of catalyst. This obvious enhancement in photocatalytic $H_2$ evolution is due to more surface being available for the oxidation and reduction reactions over the $3CFs/TiO_2$-S composite catalyst. However, when catalyst loading is increased to 150 mg, the $H_2$ production increases to 2790 ppm, which is 1.70 and 2.2 fold higher than using 100 and 50 mg loading amounts. However, any further increase in catalyst loading (200 mg) does not have much effect on enhancing $H_2$ yield. All these findings confirm that the catalyst loading of 150 mg is the optimized amount for glycerol sacrificial reagents, at which the highest amount of $H_2$ is evolved.

Based on the surface area available for the oxidation and reduction process, all of the data can be explained. There is only a small quantity of catalyst (50 mg) particles available for the reaction to occur under the source of light, which leads to a decrease in the generation of electrons and holes—both of which are crucial for redox processes. There is a decent dispersion of nanoparticles to interact with light irradiation when the catalyst loading is raised to 100 and 150 mg, allowing for additional charges to be generated for the evolution of hydrogen. However, an excessive catalyst loading might result in a light penetration resistance; as a result, when catalyst loading is raised to 200 mg, there is no appreciable impact on the generation of $H_2$, and similar patterns were previously observed. All these data support the notion that catalyst loading is another crucial factor that should be tuned for maximum photocatalytic performance under the same operating circumstances.

In the photocatalysis process, two different variables, namely, catalyst loading and light intensity, are used; thus, comparing performance of different photocatalytic system requires a more efficient approach. Calculating quantum efficiency is a more reliable method because it is based on the number of moles of products produced and the moles of photons consumed during the photocatalytic process. Thus, the relationship between the rate of production of $H_2$ and rate of photon flux ingested over the course of that particular unit of time is known as apparent quantum yield (QY), which can be calculated using Equation (3).

$$AQY \text{ of } H_2(\%) = \frac{2 \times \text{moles of } H_2(\mu\text{mole/time})}{(\text{incident area} \times \text{photon flux})(\mu\text{mole/time})} \times 100 \quad (3)$$

where the photon flux is calculated using the following parameters: wavelength of 420 nm, light intensity of 20 mW $cm^{-2}$, incident area of 28 $cm^2$, moles of $H_2$ would be in μmol/s, and the number of electrons utilized to produce $H_2$ is 2.

Table 2 provides a summary of the hydrogen production rate and apparent quantum yield for $TiO_2$, $3CFs/TiO_2$-A, and $3CFs/TiO_2$-S with different sacrificial reagents and catalyst loading. Hydrogen production rate is calculated after 2 h of irradiation time. Using pure $TiO_2$, an $H_2$ rate of 224.1 μmol $g^{-1}$ $h^{-1}$ is produced, which gets increased to 370.4 μmol $g^{-1}$ $h^{-1}$ with 3% CFs-loading (3% $CFs/TiO_2$-A). Comparatively, when catalysts are produced through sol-gel method, the highest $H_2$ production rate of 2268.4 μmol $g^{-1}$ $h^{-1}$ with QY of 6.629% over 3% $CFs/TiO_2$-S is obtained, which is 6.12 and 10.12 times more than is produced using 3% $CFs/TiO_2$-A and pure $TiO_2$ samples, respectively. This obvious improvement is due to the good interface interaction of CFs and $TiO_2$ NPs with proficient charge carrier separation and higher visible light absorption. Using 5% glycerol sacrificial reagent and 100 mg catalyst loading, an $H_2$ production rate of 4126.1 μmol $g^{-1}$ $h^{-1}$ and AQY of 12.058% are achieved, which are 1.82, 2.31, and 17.24 fold higher than those using methanol, ethanol, and butanol, respectively. More interestingly, when catalyst loading is increased, results are different, whereas the highest $H_2$ production is obtained with optimized catalyst loading of 150 mg for both glycerol and methanol sacrificial reagents. Comparatively, the highest hydrogen production of 6000.3 μmol $g^{-1}$ $h^{-1}$ and QY of 26.302% is achieved with 5% methanol and 150 mg catalyst loading. This amount of hydrogen production is 1.83 fold higher than using glycerol as the sacrificial reagents. These findings reveal that at lower catalyst loading, glycerol is more efficient for $H_2$ production, whereas, with increasing catalyst loading, methanol is the proficient sacrificial reagent due to adsorption competitions and the rate of intermediate products over the catalyst active sites. The highest AQY of 26.3% for $H_2$ production is obtained with 150 mg of catalyst loading under low-intensity light irradiation, whereas it has a lower photostability than methanol after five consecutive cycles.

TABLE 2

$H_2$ Production Rate and Quantum Yield over $TiO_2$, CF/$TiO_2$-A, and CF/$TiO_2$-S Composites with Different Sacrificial Reagents and Catalyst Loading

| Catalyst | Sacrificial reagent (vol %) | Catalyst loading (mg) | $H_2$ production rate (μmole $g^{-1}$ $h^{-1}$)* | Quantum yield (QY, %) |
|---|---|---|---|---|
| $TiO_2$ | 5% Methanol | 100 | 224.1 | 0.007 |
| 3CFs/$TiO_2$-A | 5% Methanol | 100 | 370.4 | 1.083 |
| 3CFs/$TiO_2$-S | 5% Methanol | 100 | 2268.4 | 6.629 |
| 3CFs/$TiO_2$-S | 5% Glycerol | 100 | 4126.1 | 12.058 |
| 3CFs/$TiO_2$-S | 5% Ethanol | 100 | 1783 | 0.052 |
| 3CFs/$TiO_2$-S | 5% Butanol | 100 | 239.4 | 0.699 |
| 3CFs/$TiO_2$-S | 5% Glycerol | 150 | 4650.6 | 0.204 |
| 3CFs/$TiO_2$-S | 5% Glycerol | 200 | 3287.1 | 19.211 |
| 3CFs/$TiO_2$-S | 5% Methanol | 150 | 6000.3 | 26.302 |

*Hydrogen production rate calculated after 2 h of irradiation time.

In another embodiment of the present invention, the synthesized CF/$TiO_2$ composites is examined for stability analysis. Examining the stability and reusability of the photocatalysts is an additional crucial issue that should be looked at considering their practical use and applications. Glycerol and methanol are used as the sacrificial reagents, and their 5 vol. percent concentrations are used to test the stability of 3CFs/$TiO_2$-S composite with 150 mg catalyst loading. After every completed cycle, the reactor is allowed to cool, and the hydrogen is removed from the pipeline and inside the reactor with nitrogen gas before starting the next experiment. FIG. 15A shows the stability of the photocatalyst with glycerol as the sacrificial reagent for the consecutive five cycles. Using the first cycle, the highest $H_2$ yield is obtained, and its production is continuous over the entire irradiation time. Unexpectedly, a sudden drop in the $H_2$ yield is observed in the second cycle, whereas a stable $H_2$ yield is produced until the fifth cycle. These results can be explained based on the characterization results. Initially, there is a good interface interaction of 3CFs/$TiO_2$-S, whereas when it is dispersed inside the glycerol through stirring, the CFs possibly are separated from the $TiO_2$, resulting in good interface interaction, which results in a decline in $H_2$ yield after the first cyclic run. However, a stable and continuous $H_2$ yield for the remaining cycles is possibly due to no more segregation of CFs from the $TiO_2$ surface.

The stability of 3CFs/$TiO_2$-S for photocatalytic $H_2$ evolution with 5 vol % methanol with consecutive 5 cycles is presented in FIG. 15B. In the first cyclic run, the highest amount of $H_2$ is produced over the entire irradiation time, and similar trends are obtained in the second cyclic run. However, after the second cyclic run, a sudden drop in $H_2$ yield is observed, whereas a stable performance of the photocatalyst is obtained in remaining cycles until the fifth cycle. By comparing these results with the stability of photocatalyst using glycerol, identical trends are observed. More interestingly, using methanol, a sudden drop in $H_2$ yield is observed in the second cycle, whereas for the glycerol after the first cycle, a sudden drop in $H_2$ yield is observed. These results can be explained based on the viscosity and attachment of catalyst over the catalyst surface. Due to the high viscosity of glycerol, there is more resistance for the catalyst particles to disperse inside the slurry, resulting in their early separation of CFs from the $TiO_2$ in comparison to using methanol. However, further investigations are required to further explore the sudden drop in photostability using various sacrificial reagents.

The decrease in photostability is further investigated using XRD, FTIR, and SEM analysis of the spent 3CFs/$TiO_2$-S composite samples. XRD analysis is performed to investigate the change in crystallinity and composition of the photocatalyst after five consecutive cycles, and the results are presented in FIG. 16. The same peak locations between fresh and used samples demonstrate that the peak position has not changed. New peaks are not observed in the spent composite sample, further supporting the stability and lack of structural change. Previously, XRD analysis of $TiO_2$/CF was conducted after 10 cycles, which kept the same structure as the original materials. Additionally, the photocatalyst $TiO_2$ contents remained the same from the first to the tenth cycling trials, indicating that the CF/$TiO_2$ material was sufficiently stable to produce $H_2$.

FIG. 17 shows FTIR analysis of the spent CFs/$TiO_2$-S composite after stability analysis of glycerol and methanol. Both the samples show similar IR spectra; however, some changes are observed in the vibrational modes. For example, more hydroxyl bonds are observed in the composite catalyst obtained after glycerol stability analysis, whereas using methanol, no obvious peaks related to hydroxyl group attachments are observed. This may be possibly due to more moisture content in the spent catalyst obtained after glycerol stability analysis, which is difficult to evaporate during the drying process at 100° C. In general, both the samples show similar IR peaks, confirming there are no significant structural changes in both the samples.

The morphology of the spent photocatalyst obtained after 5 cycles using glycerol as the reducing agent is further investigated, and the EDX spectrum results are shown in FIG. 18. There is a good dispersion of CF with $TiO_2$-S in the composite, which still enables the production of a higher amount of $H_2$. $TiO_2$ particles are separated from the CF surface, which are possibly responsible for the decrease in hydrogen yield after the first cycle. This is further confirmed using EDS mapping analysis. It can be observed that the dispersion of carbon with Ti and O is not uniform, which is possibly due to segregated CFs from the $TiO_2$ due to continuous stirring and agitation in the glycerol-water mixture. FIG. 18 shows the EDX spectrum, showing the presence of all of the elements in the CF/$TiO_2$ composite. The higher composition of C is possibly due to selecting small diffraction area for EDX analysis, where a greater amount of CF is present.

In another embodiment of the present invention, a mechanism is proposed for photocatalytic $H_2$ evolution over a 3CFs/$TiO_2$-S composite photocatalyst.

In photocatalysis, information about the charge production and separation is important to understand more about the process of efficiency enhancement. According to experimental results, CF/$TiO_2$-A has lower photoactivity compared to CF/$TiO_2$-S composite synthesized using the sol-gel approach. In the case of CF attached to $TiO_2$ using physical method, there is only point contact between CF and $TiO_2$; thus, only a lower transfer of electrons is possible toward the CF. However, in the case of 3% CFs/$TiO_2$-S, $TiO_2$ particles are dispersed everywhere over the entire CF surface, thus providing multichannel electron transfer, enabling efficient charge carrier separation. In previous work, similar observations were reported during investigating the effect of morphology and particle size of $TiO_2$ with other semiconductors.

The schematic illustration of hydrogen production over 3% CFs/$TiO_2$-S is further discussed in FIG. 19. Under light energy, electron (e) and holes (h) are generated over the $TiO_2$ surface, which can either recombine or can involve various oxidation and reduction reactions. Therefore, the available electrons at the CB of the semiconductor can affect the production of hydrogen, whereas $H_2$ yield can be increased by preventing the recombination of electrons and holes. According to BET analysis, loading of $TiO_2$ over CFs reduces the specific surface area; however, PL analysis reveals lower intensity in the composite compared to using pure $TiO_2$, which is due to efficient charge carrier separation. Thus, due to the good interface interaction of $TiO_2$ with CFs as cocatalyst, electrons would effectively be trapped by CF due to its conductive characteristics, resulting in efficient charge carrier separation. The holes retained at the VB of $TiO_2$ will be consumed for water and/or alcohol oxidation to produce protons (H). The electrons retained at the CBs and trapped by CFs will be used for the reduction of H to produce $H_2$. The conduction band of $TiO_2$ (CB≈−0.60 eV) calculated previously is higher than the oxidation potential of $H/H_2$ (−0.42 eV); thus, this process is favorable to produce hydrogen over the CFs/$TiO_2$ composite. Thus, due to the conductive characteristics of CFs, electrons would effectively be transferred from $TiO_2$ toward CFs, resulting in their efficient separation and utilization for reduction of protons to produce $H_2$.

The recombination of photogenerated electrons and holes can be further prevented by using sacrificial reagents, which use holes. The VB holes will oxidize alcohol (Alcohol+$h^+$ →$H^+$ oxidation products), resulting in effective utilization of holes and preventing charge recombination. Recently, it was reported that $TiO_2$/CF has higher photocatalytic $H_2$ evolution rate due to increased BET surface area, higher visible light absorption, and lower charge recombination rate. Thus, to considerably improve the photocatalytic $H_2$ evolution, CFs/$TiO_2$ is found promising because of their special features such as higher visible light absorption and conductive characteristics to promote photocatalytic activity.

In view of cost estimation, the carbon fibers (CFs) are very low-cost materials compared to expensive metals like gold (Au) and platinum (Pt) due to using carbon fiber-reinforced polymers (CFRPs). The CFRPs is a solid waste product (sewage sludge derived from the CFRP waste) which is produced by the industry in tonnes every day. On the other hand, $TiO_2$ is already a commercial catalyst, which is produced using low-cost precursors through different methods. Thus, using CFs/$TiO_2$ has more economic benefits compared to using expensive metals with $TiO_2$ to produce hydrogen.

In summary, the conversion of carbon fiber-reinforced plastics (CFRPs) into carbon fibers (CFs) through thermal decomposition shows great potential for enhancing visible light absorption with higher charge separation efficiency. The thermal decomposition method at low temperatures can derive highly conductive carbon fibres of different sizes and shapes by removing the polymer layer. The use of CF/$TiO_2$-A composite results in significantly higher hydrogen ($H_2$) production due to the higher charge separation and visible light absorption efficiency of CFs. The highest $H_2$ production of 170.82 ppm is achieved with the 3% CF/$TiO_2$-A composite, which is 22.87 fold higher than using pristine $TiO_2$-A. Further investigation into CF/$TiO_2$ performance using different synthesis methods, namely physical mixing and sol-gel approach, reveals that amount of $H_2$ yield over 3% CF/$TiO_2$-S is 6 fold more than is produced using the same CF loading but with $TiO_2$-A through a physical mixing approach (3% CF/$TiO_2$-A).

The optimized 3CFs/$TiO_2$ produces 2.87 times more hydrogen than using only pristine $TiO_2$. This noticeable enhancement is due to efficient charge separation in the presence of CFs with high visible light absorption. Comparatively, the CFs/$TiO_2$-S nanotexture produced $H_2$ at 2268.4 μmol g-1 h-1, which is 6-12 fold greater than that for CFs/$TiO_2$ and pristine $TiO_2$ samples. Using the sol-gel approach, $TiO_2$ is effectively attached over the entire surface of CFs, enabling good interface interaction and efficient charge carrier separation, resulting in significantly enhanced $H_2$ production.

In another embodiment of the present invention, various operating parameters and sacrificial reagent are used to enhance $H_2$ production. Among the various operating parameters used, glycerol as a sacrificial reagent is effective in enhancing $H_2$ yield, whereas it has a lower photostability than methanol after five consecutive cycles. The highest AQY of 26.3% for $H_2$ production is obtained with 150 mg of catalyst loading under low-intensity light irradiation. The invention presents a novel method of recycling solid waste CFRPs to produce CF-based composites for enhancing performance in solar energy-related applications.

This significant enhancement in photoactivity is attributed to the good interface interaction between CF and $TiO_2$ achieved through the sol-gel approach, leading to enhanced photocatalytic activity for $H_2$ production. Glycerol is one of the most effective sacrificial reagents, yielding higher $H_2$ compared to methanol, ethanol, and butanol. Among the catalyst loading, the $H_2$ yield increases with more catalyst loading, until reaching an optimized loading amount of 150 mg. The stability of the 3% CFs/$TiO_2$-S composite is investigated using glycerol and methanol as sacrificial reagents, revealing similar trends where stability drops after the first cycle but there is continuous $H_2$ evolution for 5 cycles. This invention introduces a novel method for recycling CFRP and constructing CF-based $TiO_2$ composites, offering development of highly effective photocatalysts and solar energy applications. It has the potential to accelerate the development of renewable energy sources and reduce dependency on fossil fuels.

Solid waste such as aircraft waste, and car waste can be used to produce high-quality carbon fibres. Carbon fibre can be incorporated as a sensitizer in dye-sensitized solar cells to increase efficiency and stability.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims. Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A method of developing semiconductor photocatalysts by recycling Carbon Fiber-Reinforced Polymers (CFRP) waste, the method comprising the steps of:

separating or removing a polymer layer of carbon-fibre waste via thermal decomposition under a controlled nitrogen atmosphere at temperatures ranging between 400-700° C. to yield conductive one-dimensional carbon fibers (1D CFs); and coupling the resulting carbon-fibers as a cocatalyst with titanium dioxide ($TiO_2$) via a sol-gel method comprising dispersing titanium (IV) isopropoxide (TTIP) in 2-propanol and hydrolyzing the dispersed TTIP using acetic acid to form a titanium sol, adding the carbon fibres to the titanium sol and stirring for a period to produce a thickened titanium sol, and drying and heating the resulting product to obtain a CFs/$TiO_2$ sol-gel (CFs/$TiO_2$-S) composite having a core-shell structure in which $TiO_2$ nanoparticles are uniformly attached over an entire surface of the carbon fibres; and using the CFs/$TiO_2$-S composite for photocatalytic water splitting to produce hydrogen ($H_2$), wherein the $TiO_2$ nanoparticles are spherical, well-distributed, and uniformly sized without agglomeration, and wherein the CFs/$TiO_2$-S composite provides multichannel electron transfer from $TiO_2$ to the carbon fibers for charge carrier separation.

2. The method of claim 1, wherein the thermal decomposition comprises pyrolysis at temperatures ranging between 400-700° C. for heating times of 1 to 4 hours, yielding conductive carbon fibers (CFs).

3. The method of claim 2, wherein the CFs are tailored into various sizes and shapes by eliminating the polymer layer.

4. The method of claim 2, wherein the CFRP serving as the raw material is subjected to pyrolysis, the method comprising the following steps:

evenly cutting CFRP sheets into smaller sized rectangular shapes;

placing the cut CFRP sheets in a ceramic crucible; heating the CFRPs in a tube furnace under a controlled nitrogen atmosphere for removing polymeric material; and grinding the pyrolyzed product and pulverizing the ground product into fine powder.

5. The method of claim 4, wherein the controlled nitrogen atmosphere comprises a temperature of 500° C. for 2 hours.

6. The method of claim 4, wherein the smaller sized rectangular shapes are 2-6 cm in length and 1-4 cm in width.

7. The method of claim 4, wherein pulverizing the ground product into powder is done using a planetary ball mill.

8. The method of claim 1, wherein the sol-gel method comprises:

dispersing 10 mL of TTIP in 2-propanol; hydrolyzing the dispersed TTIP using acetic acid at a concentration of 1 M to obtain a titanium sol;

adding the carbon fibers to the titanium sol while stirring, and maintaining the stirring for an additional 12 hours to produce a thickened titanium sol;

oven-drying the resulting slurry at 100° C. for 24 hours; and heating the dried product at 500° C. for 2 hours to obtain the CFs/$TiO_2$-S composite.

9. The method of claim 8, wherein using the sol-gel approach, $TiO_2$ is attached over the entire surface of CFs, enabling interface interaction and charge carrier separation, resulting in an $H_2$ production rate of CFs/$TiO_2$-S that is 6-fold to 12-fold greater than that for CFs/$TiO_2$ prepared by physical mixing and pristine $TiO_2$ samples.

10. The method of claim 8, wherein using the sol-gel approach results in achieving a core-shell structure of nanoparticles with carbon fibres.

11. The method of claim 1, wherein the CFRP waste-derived carbon fibers (CFs) are coupled with $TiO_2$ to construct CFs/$TiO_2$ nanotextures with interface charge transfer for stimulating photocatalytic hydrogen production, and wherein glycerol is used as a sacrificial reagent to improve hydrogen ($H_2$) yield.

12. The method of claim 11, wherein the glycerol is used at a concentration of 5 vol % and produces the largest amount of $H_2$, which is 1.8, 2.3, and 17.2 times more than those of methanol, ethanol, and butanol, respectively.

13. The method of claim 1, wherein the CFs/$TiO_2$-S composite is used with a catalyst loading of 150 mg and an apparent quantum yield (AQY) of 26.3% for $H_2$ production is obtained under low-intensity light irradiation.

14. The method of claim 1, wherein the CFs loading in the CFs/$TiO_2$-S composite is 3 wt %, and the optimized 3CFs/$TiO_2$-S composite produces 2.87 times more hydrogen than using only pristine $TiO_2$.

* * * * *